US006728792B2

(12) United States Patent
Wagner

(10) Patent No.: US 6,728,792 B2
(45) Date of Patent: Apr. 27, 2004

(54) PRIORITY QUEUE WITH ARBITRARY QUEUING CRITERIA

(75) Inventor: Marcus Wagner, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 09/754,658

(22) Filed: Jan. 4, 2001

(65) Prior Publication Data

US 2002/0087757 A1 Jul. 4, 2002

(51) Int. Cl.[7] ............................................... G06F 13/00
(52) U.S. Cl. .......................... 710/6; 710/111; 710/244; 711/158; 707/7
(58) Field of Search ................................ 345/823, 769; 707/7, 102; 710/5–6, 44, 32–35, 107–117, 102, 244; 711/112, 158; 348/229.1

(56) References Cited

U.S. PATENT DOCUMENTS

| | | | | |
|---|---|---|---|---|
| 5,623,693 A | * | 4/1997 | Ashton et al. .................. 710/5 |
| 5,630,123 A | * | 5/1997 | Hogge ............................ 707/7 |
| 5,706,449 A | * | 1/1998 | Liu et al. ..................... 345/823 |
| 5,774,121 A | * | 6/1998 | Stiegler ....................... 345/769 |
| 6,003,101 A | | 12/1999 | Williams ..................... 710/112 |
| 6,052,147 A | * | 4/2000 | Cheng ...................... 348/229.1 |
| 6,055,533 A | * | 4/2000 | Hogge ............................ 707/7 |
| 6,145,031 A | * | 11/2000 | Mastie et al. ................. 710/52 |
| 6,170,042 B1 | * | 1/2001 | Gaertner et al. ............ 711/158 |
| 6,301,639 B1 | * | 10/2001 | Cleavinger et al. ......... 711/112 |
| 6,421,676 B1 | * | 7/2002 | Krishnamurthy et al. ... 707/102 |
| 6,442,631 B1 | * | 8/2002 | Neufeld et al. ............. 710/107 |

\* cited by examiner

Primary Examiner—Christopher B. Shin
(74) Attorney, Agent, or Firm—Karna J. Nisewaner

(57) ABSTRACT

A method in a computing system (100) includes the steps of enqueuing items in a functional queue prioritized according to sort criteria (132), modifying the sort criteria (132) while the functional queue contains the enqued items, and re-prioritizing the enqued items in the functional queue according to the modified sort criteria (132). The computing system (100) includes a set of functions (122) that operate on a queue data structure (130) to maintain enqued items prioritized in the queue data structure (130) after changes in the sort criteria (132). The set of functions (122) operate with an arbitrary number of sort criteria (132) and with arbitrary values for the sort criteria (132).

23 Claims, 21 Drawing Sheets

| Queue_Item_ID | User_assigned_priority | Delivery_deadline | Profit |
|---|---|---|---|
| 1 | 1 | 11/15/00 - 17:00:00 | 500 |
| 2 | 1 | 11/16/00 - 08:00:00 | 600 |
| 3 | 1 | 01/01/01 - 17:00:00 | 800 |
| 4 | 2 | 11/15/00 - 17:00:00 | 900 |
| 5 | 3 | 11/15/00 - 08:30:00 | 100 |
| 6 | 3 | 11/15/00 - 17:00:00 | 200 |
| 7 | 4 | 11/16/00 - 08:00:00 | 500 |
| 8 | 4 | 11/17/00 - 08:00:00 | 600 |

*FIG. 3*

| Queue_Item_ID | User_assigned_priority | Delivery_deadline | Profit |
|---|---|---|---|
| 3 | 1 | 01/01/01 - 17:00:00 | 800 |
| 2 | 1 | 11/16/00 - 08:00:00 | 600 |
| 1 | 1 | 11/15/00 - 17:00:00 | 500 |
| 4 | 2 | 11/15/00 - 17:00:00 | 900 |
| 6 | 3 | 11/15/00 - 17:00:00 | 200 |
| 5 | 3 | 11/15/00 - 08:30:00 | 100 |
| 8 | 4 | 11/17/00 - 08:00:00 | 600 |
| 7 | 4 | 11/16/00 - 08:00:00 | 500 |

*FIG. 4*

| Queue_Item_ID | User_assigned_priority | Delivery_deadline | Profit |
| --- | --- | --- | --- |
| 1 | 1 | 11/15/00 - 17:00:00 | 500 |
| 2 | 1 | 11/16/00 - 08:00:00 | 600 |
| 3 | 1 | 01/01/01 - 17:00:00 | 800 |
| 4 | 2 | 11/15/00 - 17:00:00 | 900 |
| 5 | 3 | 11/15/00 - 08:30:00 | 100 |
| 6 | 3 | 11/15/00 - 17:00:00 | 200 |
| 7 | 4 | 11/16/00 - 08:00:00 | 500 |
| 8 | 4 | 11/17/00 - 08:00:00 | 600 |

*FIG. 5*

| Queue_Item_ID | User_assigned_priority | Delivery_deadline | Profit |
|---|---|---|---|
| 5 | 3 | 11/15/00 - 08:30:00 | 100 |
| 4 | 2 | 11/15/00 - 17:00:00 | 900 |
| 1 | 1 | 11/15/00 - 17:00:00 | 500 |
| 6 | 3 | 11/15/00 - 17:00:00 | 200 |
| 2 | 1 | 11/16/00 - 08:00:00 | 600 |
| 7 | 4 | 11/16/00 - 08:00:00 | 500 |
| 8 | 4 | 11/17/00 - 08:00:00 | 600 |
| 3 | 1 | 01/01/01 - 17:00:00 | 800 |

*FIG. 6*

PRIORITY QUEUE WITH ARBITRARY QUEUING CRITERIA

BACKGROUND OF THE INVENTION

1. Field of the Invention

This invention generally relates to data processing systems, and more particularly relates to methods for servicing queuing requests while prioritizing queue items according to flexible queuing criteria.

2. Description of Related Art

Computing systems commonly utilize queuing when more work is requested in terms of tasks (jobs) than there are resources available to serve or process the work at the time of the job submission, or when the jobs have release dates before which they may not be served by the requested resource(s). A queuing system, however, should not be mistaken for a scheduling system. Instead, a queuing system is typically an integral part of a scheduling system, where the scheduling system determines the number of sort criteria, their respective ranges of values, and the scheduling policy based upon which jobs are retrieved from the queuing system and dispatched for processing.

Typically, a job queue has only one or a few sorting criteria, according to which it places the submitted jobs. For example, priority, job size, expected job duration, are common queuing criteria. There may be high, medium, and low job priorities and within each of these priorities, there may be a small job sub-queue and a large job sub-queue. Then, typically the overall queuing system may allocate job processing resources to each of these sub-queues according to a given schedule.

Unfortunately, since the number and type of queuing criteria for a queuing system is typically fixed in the software code, any attempt at customizing a computing system's queuing mechanisms requires significant technical and programming resources. Additionally, the internal structure of queue items usually is closely tied to the sorting and prioritizing algorithms for a specific queuing system. Hence, a customization of a system would also likely require re-formatting all queue items for a particular system. This is a costly endeavor that typically makes customization, such as to improve performance or to change queuing criteria of a queuing system, prohibitive for many computing systems.

Therefore a need exists to overcome the problems with the prior art as discussed above, and particularly for an improved queuing system that can be quickly and easily customized without necessarily having to change the queuing system software or re-formatting existing queue items.

BRIEF DESCRIPTION OF THE DRAWINGS

FIGS. 3 through 6 are tabular representations of an exemplary data structure of a priority queuing system illustrating various prioritizing of queue items based on varying configuration of the priority queuing system, according to a preferred embodiment of the present invention.

DESCRIPTION OF THE PREFERRED EMBODIMENTS

Figure 1:
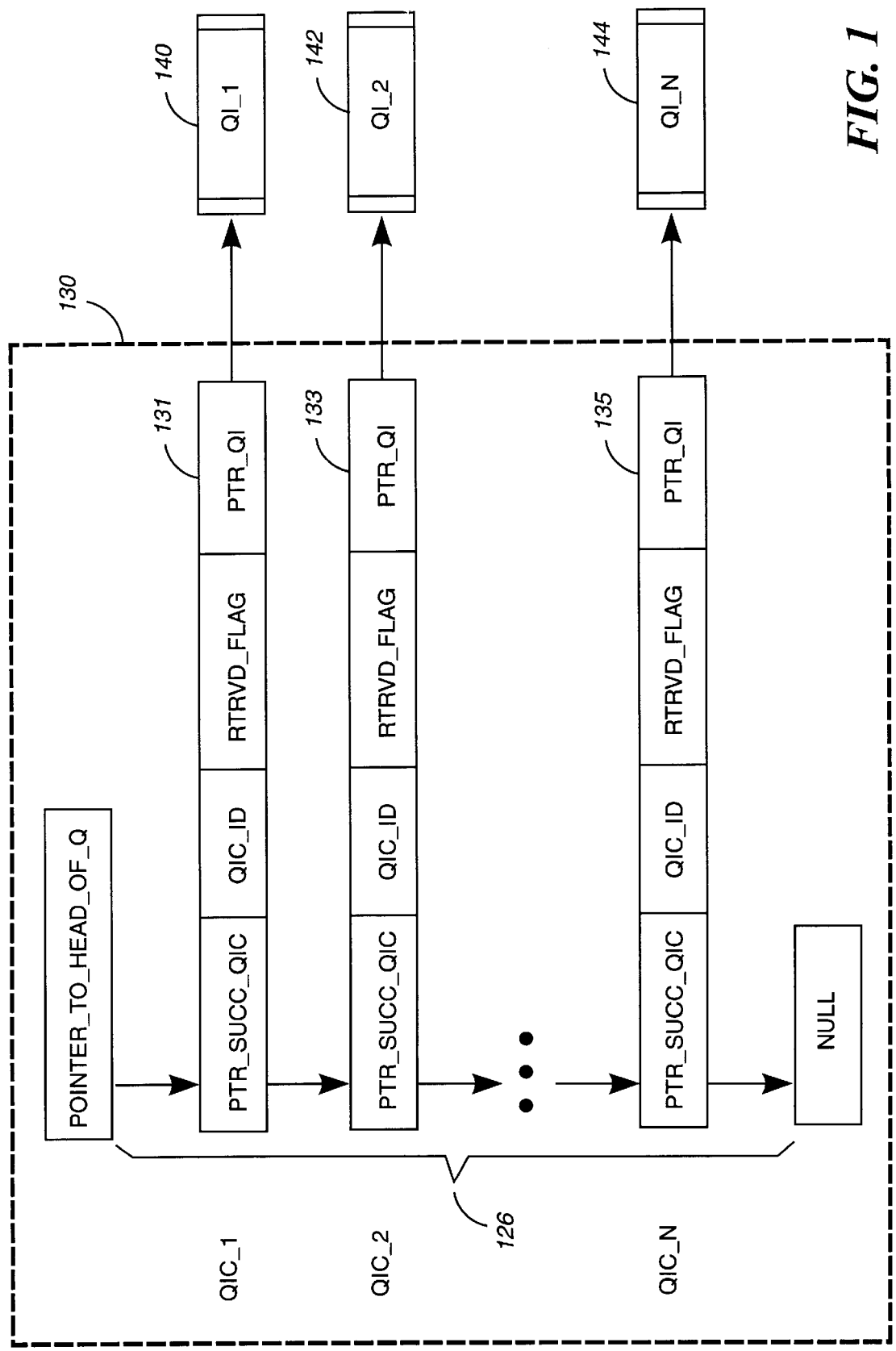
FIG. 1 is a block diagram illustrating an exemplary data structure for a priority queuing system, in accordance with a preferred embodiment of the present invention.

A preferred embodiment of the present invention, hereinafter referred to as AutoQ, utilizes a structure and operation of a generalized job queue as will be discussed below. A main advantage of AutoQ is its large degree of flexibility with respect to the number and type of sorting criteria according to which individual queue items can be ordered, and the arbitrary number of values within each sorting criterion that each queue item can attain.

Queuing systems commonly are used when more work is specified in terms of tasks (jobs) than there are resources available to serve or process at the time of the job submission, or when the jobs have release dates before which they may not be served by the requested resource(s). AutoQ, as will be discussed in the examples below, is presented according to the case where the release of all submitted jobs has already passed, i.e., all jobs are ready for processing as soon as the resources become available. However, an extension of the examples, to include the case where a future release date could be associated with each job, should be obvious to those of ordinary skill in the art. See the section entitled "Appendix—Generalizations" for more details.

Typically, a job queue has only one or a few sorting criteria, according to which it places in the queue the submitted jobs. For example, it can place in the queue by priority, job size, and expected job duration. There may be high, medium, and low job priorities and within each of these priorities, there may be a small job sub-queue and a large job sub-queue. Then, typically, the overall queuing system may allocate job processing resources to each of these sub-queues according to a given schedule.

According to the preferred embodiments of the present invention, a queuing system can utilize an arbitrary number of sorting criteria that can preferably be determined and changed at runtime. Moreover, each of these sort criteria can have an arbitrary number of values. Additionally, the specification of these sort criteria can be done by a user of the queuing system and without having to change the software code or re-formatting any of the existing queue items. In one example, the sorting criteria may be arranged as follows:

Priority_1 . . . Priority_NP, and within every one of NP priority classes,

Deadline_1 . . . Deadline_ND, and within every one of ND deadline classes,

Job_size_1 . . . Job_size_NS, and within every one of NS job size classes,

Billing_value_1 . . . Billing_value_NB, and within each one of NB billing value classes, Late_delivery_penalty_1 . . . Late_delivery_penalty_NL, where the number of different values that a queued item can take with respect to any sort criterion, i.e., NP, ND, NS, NB, NL, is arbitrary. In other words, the AutoQ queuing system allows for an arbitrary number of sorting criteria, each of which can have an arbitrary number of values. This is a significant advantage of the present invention that is not available in any known prior art systems. Since these sorting criteria can be specified and changed at runtime, a software library implementing this queuing mechanism is very flexible and requires no customization of the software.

A queuing system should not be mistaken for a scheduling system. Instead, a queuing system is typically an integral part of a scheduling system, where the scheduling system determines the number of sort criteria, their respective ranges of values, and the scheduling policy based upon which jobs are retrieved from the queuing system and dispatched for processing.

Examples used in this disclosure are drawn from an application context, i.e., a software and hardware solution for the distribution and management of multimedia content. However, it should be understood by those of ordinary skill in the art that embodiments of this invention are similarly applicable to the general case of job scheduling as to other environments, for example, such as manufacturing environments or other queuing applications that can be realized by those of ordinary skill in the art.

The following table shows abbreviations that will be used in this patent application.

Abbreviations

FIFO=first-in-first-out;

QI=Queue Item, i.e., the type of object that describes a job;

QIC=Queue Item Container: a software construct that encapsulates a pointer or reference to a QI and queuing information pertaining to that QI;

SC=Sort Criterion;

w.r.t.=with respect to.

1.0 List of Advantages of Preferred Embodiments of The Invention 1.1 The number of sort criteria (SC) within the queue is arbitrary.

1.2 Each sort criterion can have an arbitrary number of values.

These values do not have to be contiguous and they do not have to be monotonously increasing or monotonously decreasing; instead, a set of allowed values can be explicitly specified, c.f., 1.3.

1.3 The user or administrator of the AutoQ system specifies the ordering functions for each sort criterion, e.g., whether a large job is to be treated with more urgency than a small job, or vice versa.

S/he can even specify an arbitrary, explicitly listed ranking of priority values, e.g., the job priorities values, in increasing urgency, could be explicitly specified as (2, 1, 8, 6).

Also, a sort criterion can depend on more than a single property of the QIs. E.g., an ordering function that implements a given sort criterion could rank two QIs according to the respective return value of each QI, of a function such as, F(QI)=CONST_1*QI.getPriotiry( )+CONST_2*QI.getProfit( )*
{1-CONST_3*
exp[CONST_4*(getCurrentTime( )-QI.getDeliveryDeadline( ))]};

1.4 The order in which the sort criteria are specified implicitly defines their relative importance to AutoQ:

The SC specified first is treated as the most important one, the SC specified second is treated as the second most important one, etc.

1.5 The memory requirement of AutoQ is small, scaling approximately as: MEMORY=CONST_1+CONST_2*NUMBER_OF_QIs, close to independent of the number of sort criteria and possible values of any QI w.r.t. any sort criterion; the memory requirement on AutoQ per sort criterion is no more than 8 Bytes, regardless of the number of queue items. Of course, the object code that implements the sort criteria as ordering functions requires memory, but that is independent of the number of QIs—nor is it part of AutoQ.

1.6 The CPU time requirement of inserting a QI into AutoQ is close to independent of the number of sort criteria, i.e., the number of sort criteria enters as an additive term into the overall computational complexity.

1.7 A less important sort criterion can never undo the ordering mandated by a more important SC, even though all SC are applied to all QIs.

1.8 Queue items that are equal with respect to all of their sort criteria are inserted such that the most recently inserted QI comes after all previously inserted such QIs. Hence, for QIs that are equal w.r.t. all sort criteria, this invention preferably functions as a first-in-first-out (FIFO) queue, to guarantee fairness. The priority of a QI is uniquely determined by the set of its priority values, one value per sort criterion, and by the order in which this QI was inserted into the queue.

1.9 Queue items are inserted into the queue according to their priority, where higher priority QIs are always inserted before lower priority ones. Hence, retrieval of the highest priority QI always takes the same amount of time, independent of the number of items queued and independent of the number of sort criteria, because retrieving the next item always amounts to getting the top/head item of the queue.

1.10 If the number of QIs is large then binary search could be used for the insertion, e.g., as detailed in U.S. Pat. No. 6,003,101, entitled Efficient Priority Queue, by Byron Allen Williams of IBM Corp., the entire teachings of which are hereby incorporated by reference. For AutoQ, one could save two pointers for each distinct, non-empty set of sort criteria values, one pointer to the first QI in that set, and one to the last QI in that set.

1.11 A change of the number of sort criteria does not require customization or recompilation of the AutoQ code, which makes an embodiment of the present invention well suited to be implemented as a library collection of functions and routines.

The AutoQ system manages queue items (QIs) according to an arbitrary number of sort criteria specified by the AutoQ administrator, in the form of ordering functions that AutoQ applies to determine the ranking of QIs, implying that QI must have a well defined value with respect to each used sort criterion. The AutoQ system is independent of the internals of the QIs and of the compare functions that a user specifies to implement the ranking of QIs according to the sort criteria.

To save computer memory and to maintain the general applicability of this invention to any items to be enqueued, the AutoQ system does not queue the actual queue item. Instead, queue item containers (QICs) are enqueued, in form of a singly linked list 126, as illustrated in the data structure 130 shown in FIG. 1. A QIC merely contains a pointer (or a reference) 131, 133, 135, to the actual QI 140, 142, 144, and a pointer (or a reference) to its successor in the linked list 126. If a QI does not have a successor in the AutoQ system then its pointer (or reference) to successor is NULL.

For better readability, only the term, pointer, will be used, with the understanding that in some programming languages, the list might be better implemented using references, rather than pointers. However, the specific representation of this detail is not significant for this invention. Also the term, arbitrarily large, will be used to mean, as large as can fit into a computer memory 106, as shown in FIG. 2, implying that there is no hard, intrinsic numerical limit to this invention.

In terms of algorithms, an important contribution of the AutoQ system is its function to add a new QI to the queue data structure 130 according to that QI's rank as determined by an arbitrary number of arbitrary sort criteria, which can be changed at runtime without any change to the library implementing the AutoQ system. The remaining functions constituting the AutoQ system are specified below, primarily to give a self-contained exemplary presentation of this invention that will be clearly understood by those of ordinary skill in the art. However, it should be clear, in view of the discussion herein, that a preferred embodiment of the queueing system 100, comprising the exemplary AutoQ functions 122 and associated queue data structure 130, embodies a method that enqueues items in a functional queue prioritized according to sort criteria 132, allows modification of the sort criteria 132 while the functional queue contains the enqued items, and allows re-prioritizing of the enqued items in the functional queue according to the modified sort criteria 132. This modification of the sort criteria 132 is very flexible and can be done even during run-time of the queueing system 100. That is, the sort criteria 132, specifically, can be changed while the set of AutoQ functions 122 are operational on the queue data structure 130 to maintain the enqued items prioritized in the queue data structure 130 according to the sort criteria 132. This flexible redefinition of sort criteria, even while the system is operational, is a significant advantage of the present invention that is not available in any known prior art queueing system.

Additionally, in terms of data structures, an important aspect of this invention is that an arbitrarily large array of "pointers to function" can be used to allow the AutoQ system to handle an arbitrarily large number of user-specified compare functions to determine the appropriate location for insertion of a new queue item, without having to know anything about the queue items or the sort functions. Specifically, the sort criteria 132 can comprise an arbitrary number of sort criteria. Further, the sort criteria can comprise arbitrary values. This flexibility in specifying the sort criteria 132 as well as the significant advantage that the sort criteria is modifiable at runtime makes the AutoQ system a superior queueing system 100 implementation over any known prior art queueing system.

Figure 2:
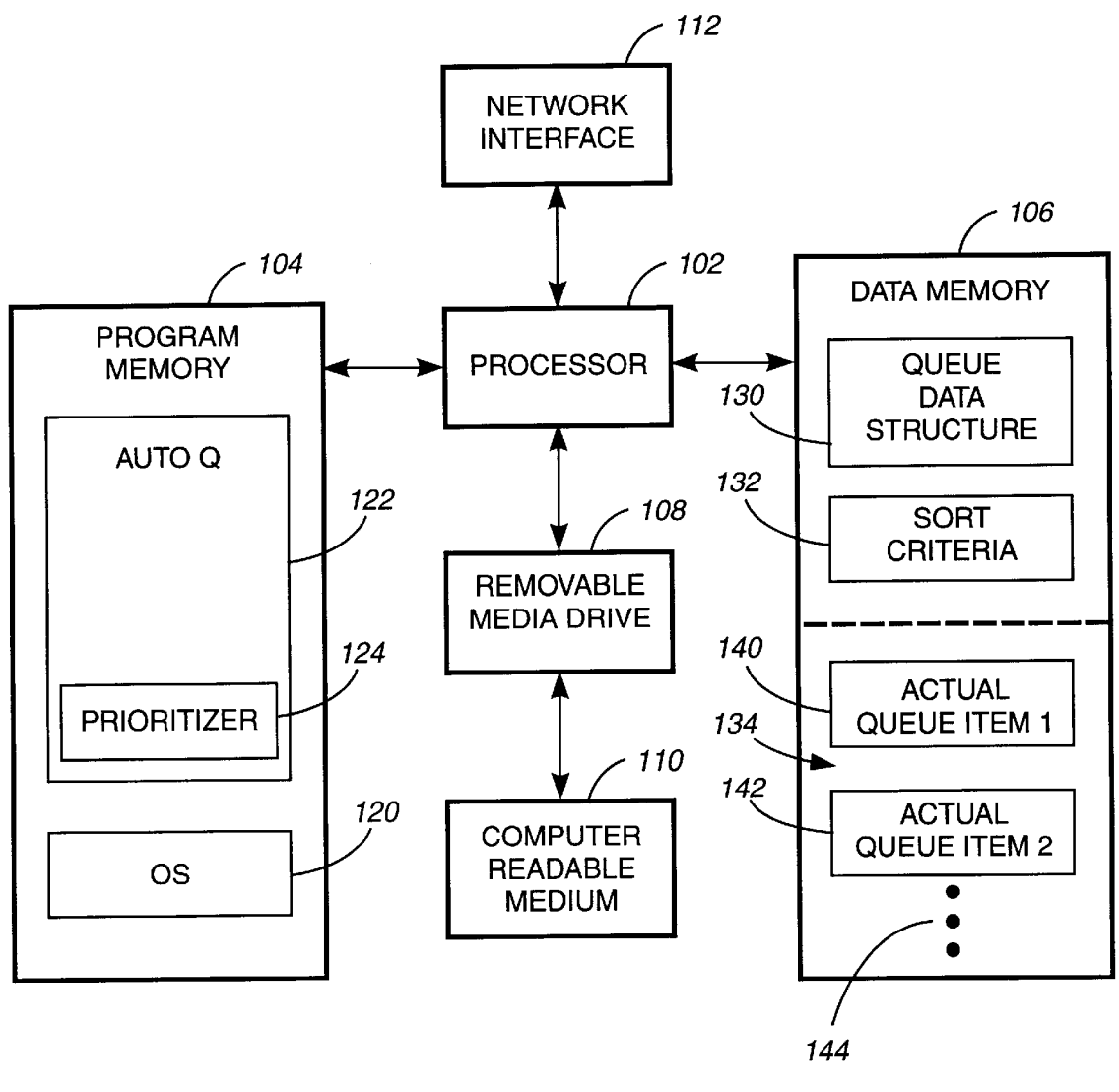
FIG. 2 is a block diagram illustrating an exemplary priority queuing system utilizing the data structure of FIG. 1, in accordance with a preferred embodiment of the present invention.

Referring to FIGS. 1 and 2, a computer system 100 is shown in accordance with a preferred embodiment of the present invention. The computer system 100 includes a processor 102 that is communicatively coupled to a program memory 104 and to a data memory 106. The processor 102 is also electrically coupled to a removable media drive, such as a CD-ROM drive or a floppy drive, that is compatible with an exemplary computer readable medium 110, such as a CD-ROM or a floppy, that contains programs and data for use by the computer system 100.

The processor 102 is also electrically coupled to a network interface 112 that allows the computer system 100 to communicate with other devices and systems via one or more networks (not shown). For example, the computer system 100 may communicate via the network interface 112 with a local area network or with a wide area network such as the Internet.

The program memory 104 is preferably a non-volatile memory and it contains programs for the computer system 100. For example, it contains the operating system 120 and may contain applications (not shown). The AutoQ queuing functions 122 are stored in the program memory 104. These functions 122 include a prioritizer 124 that maintains the linked list 126 of enqueued items in a queue data structure 130 prioritized according to sort criteria 132. Note that the set of functions constituting the AutoQ system 122 and the associated queue data structure 130 constitute a functional queue that is operational to enqueue items prioritized according to the sort criteria 132. Additionally, the enqueued items in the queue data structure 130 preferably include pointers 131, 133, 135, that point from the queue item containers (QIC's) (in the linked list 126) to the actual queue items 140, 142, 144, that may be located in another portion 134 of the memory 106. The term computer system 100, according to the discussion of the preferred embodiments of the present invention, may be used interchangeably with the term queueing system 100, recognizing that the computer system 100 comprises the queueing system 100 for the sake of the discussion.

According to a preferred embodiment of the present invention, as shown in FIG. 2, the computing system 100 utilizes the AutoQ system 122 in program memory 104 and associated queue data structure 130 in data memory 106 to maintain the enqueued items (QIC's) prioritized in the queue data structure 130 based on the sort criteria 132. The queue data structure 130 is shown, in this example, populated with N queue item containers (QICs) in a linked list 126.

Each QIC contains
 a pointer (Ptr_Succ_QIC) to its successor QIC in the queue,
 a QIC identifier (QIC_ID) that is unique over the lifetime of the queue,
 a flag (Rtrvd_Flag) indicating whether this QIC currently has the status, RETRIEVED==TRUE, and
 a pointer (Ptr_QI) 131, 133, 135, to the queue item (QI) 140, 142, 144, enqueued by the particular QIC.

Thus, the storage space for each QIC can typically be equivalent to that of two pointers, one Boolean variable and one integer. Note that the structure of the QIC and of AutoQ 122 is independent of the structure and content of the QI's 140, 142, 144, and of the number and type of sort criteria 132 used. Preferably, the QIs themselves are not enqueued by AutoQ 122; instead, only pointers 131, 133, 135, to the QIs 140, 142, 144, are enqueued.

Rather than enqueuing queue items (QIs) directly, the AutoQ system enqueues queue item containers (QICs) in a linked list where the order of the QICs is identical to the ranking of the QIs, the highest ranking QI being at the head of the queue.

Each QIC contains a pointer to its successor QIC in the linked list 126 constituting the queue data structure 130, a unique identifier of the QIC, a pointer 131, 133, 135, to the QI 140, 142, 144, that this QIC represents in the queue data structure 130, and a flag that indicates whether the QI pointed at is currently retrieved from the queue. Thus, a QIC requires very little memory and is independent of the structure and the size of the QI.

The ranking of the QIs within the AutoQ system 122 (and equivalently, that of the QICs), is determined by an arbitrary number of sort criteria that an administrator of the queuing system 100 can specify. A sort criterion preferably is implemented as a compare function that can determine which one of two QIs ranks higher with respect to (w.r.t.) this sort criterion, or if both QIs are equal w.r.t. this sort criterion.

An administrator of the AutoQ system 122 will specify as many sort criteria 132 as desired, in the form of compare functions that act on the QIs to be enqueued. The AutoQ system 122 has no need to know anything about what data fields of the QIs are used for the respective comparison (it can be any combination of properties of a QI) or how the comparison is done; only the outcome of the comparison matters to AutoQ 122. In fact, the only knowledge the AutoQ system 122 has about the QIs it manages, consists of the pairwise relative ranking of QIs, as determined by the user specified compare functions.

The following queueing system 100 example is intended to demonstrate effect of the specification of sorting criteria to the AutoQ system 122.

Assume there to be the following QIs that have, among other properties and data content, the tabular fields shown in FIG. 3.

Also, assume that the following compare functions exist, without being specified to the AutoQ system 122, yet.

Compare_Priority(leftQI, rightQI, result)
// comment: lower User_assigned_priority value implies higher ranking.
If (leftQI.User_assigned_priority.numerical_value<rightQI.User_assigned_priority.numerical_value)
result=leftQI ranks higher w.r.t. this sort criterion;
else
If (rightQI.User_assigned_priority.numerical_value< leftQI.User_assigned_priority.numerical_value)
result=rightQI ranks higher w.r.t. this sort criterion;
else
result=leftQI and rightQI rank equal w.r.t. this sort criterion;
end Compare_Priority
Compare_Delivery_deadline leftQI, rightQI, result)
// comment: earlier Delivery_deadline implies higher ranking.
If (leftQI. Delivery_deadline IS_EARLIER_THAN rightQI. Delivery_deadline)
result=leftQI ranks higher w.r.t. this sort criterion;
else
If (rightQI. Delivery_deadline IS_EARLIER_THAN lefttQI. Delivery_deadline)
result=rightQI ranks higher w.r.t. this sort criterion;
else
result=leftQI and rightQI rank equal w.r.t. this sort criterion;
end Compare_Delivery_deadline
Compare_Profit(leftQI, rightQI, result)
// comment: higher Profit implies higher ranking.
If (leftQI. Profit>rightQI. Profit)
result=leftQI ranks higher w.r.t. this sort criterion;
else
If (rightQI. Profit>left.QI. Profit)
result=rightQI ranks higher w.r.t. this sort criterion;
else
result=leftQI and rightQI rank equal w.r.t. this sort criterion;
end Compare_Profit Now, we will briefly discuss the effect of varying the sorting criteria specified for the AutoQ system. References will be made to FIGS. 4, 5, and 6, for discussing the various examples.

EXAMPLE 1

If one specifies the following to the AutoQ system
number_of_sort_criteria=2;
compare_function[0]=Compare_Priority;
compare_function[1]=Compare_Profit;
then AutoQ will order the QIs of the above table in the order shown in FIG. 4.

Here, the QIs are ranked according to their User_assigned_priority and their Profit as specified by the ordering functions, [0] and [1] respectively, while other properties of the QIs are ignored. The User_assigned priority is the overriding sort criterion because it was specified with the lowest compare function index, 0. The secondary sort criterion, Profit, causes the ranking within classes of QIs that have an equal User_assigned_priority, but it can not undo the ranking imposed by the User_assigned_priority, since the latter was specified as a compare function with a lower valued function index. FIG. 4 shows that the QIs are listed in order of User_assigned_priority and within each class, in order of decreasing Profit. The ordering by values of the QI property, Delivery_deadline, is coincidental and irrelevant.

EXAMPLE 2

If AutoQ is instructed to use these specifications
number_of_sort_criteria=3;
compare_function[0]=Compare_Priority;
compare_function[1]=Compare_Delivery_deadline;
compare_function[2]=Compare_Profit;
then the QIs will have the ranking within AutoQ as shown in FIG. 5.

Here, the QIs are ranked according to their User_assigned_priority, Delivery_deadline and Profit, in that order. Hence, the overriding sort criterion is the User_assigned_priority. Within classes of QIs sharing the same User_assigned_priority, the order is mandated by the Delivery deadline. That is, among QIs with the same User_assigned_priority, QIs with an earlier Delivery_deadline rank higher, implying they qualify for being processed sooner. However, even an earlier and hence, more urgent, Delivery_deadline can not upset the ordering due to the User_assigned_priority, as is evident, e.g., from comparing the QIs 3 and 4 of FIG. 5. Finally, the Profit associated with the QIs of this example causes AutoQ to rank the QIs within classes of equal Delivery_deadline, without changing the orderings implied by the Delivery_deadline and by the User_assigned_priority.

EXAMPLE 3

If AutoQ is instructed to use these specifications
number_of_sort_criteria=2;
compare_function[0]=Compare_Delivery_deadline;
compare_function[1]=Compare Profit;
then the QIs will have the ranking within AutoQ as shown in FIG. 6.

Here, the QIs are ranked according to their Delivery_deadline and their Profit while their User_assigned_priority is ignored. The Delivery_deadline is the primary sort criterion, and within classes of equal Delivery_deadline, AutoQ ranks the QIs in order of decreasing Profit. The ordering by values of the QI property, User_assigned_priority, is coincidental and irrelevant.

Now a more detailed discussion of an exemplary embodiment of the AutoQ System 122 will follow.

Exemplary Functionality of an AutoQ System

Listed below is a functional description of an exemplary AutoQ system 122, where the exemplary representation was chosen mainly for readability.

In the implementation listed below, with the exception of the constructor and the destructor functions, all exemplary AutoQ functions return an object that indicates whether the function was successful and, in the case of an unsuccessful function, it returns an error code.

As a complement to the listing of nine (9) functions and associated comments for the exemplary AutoQ system 122, as set forth below, additionally a set of corresponding flow diagrams shown in FIGS. 7 through 22 provide additional detailed description to more clearly describe the preferred embodiments of the present invention.

Figure 7:
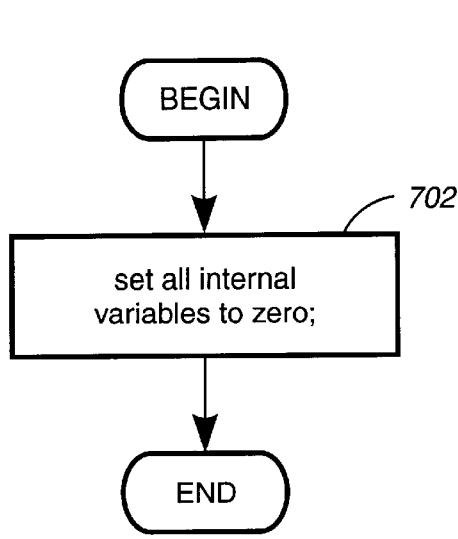
FIGS. 7 through 22 are flow diagrams comprising a set of operational sequences for an exemplary priority queuing system, in accordance with a preferred embodiment of the present invention.

1. AutoQ( ),
   purpose:
   constructor function to instantiate and
   initialize the AutoQ system;

As shown in FIG. 7, the AutoQ system 122 comprises a constructor function (listed above) that, at step 702, initializes all internal variables to zero.

Figure 8:
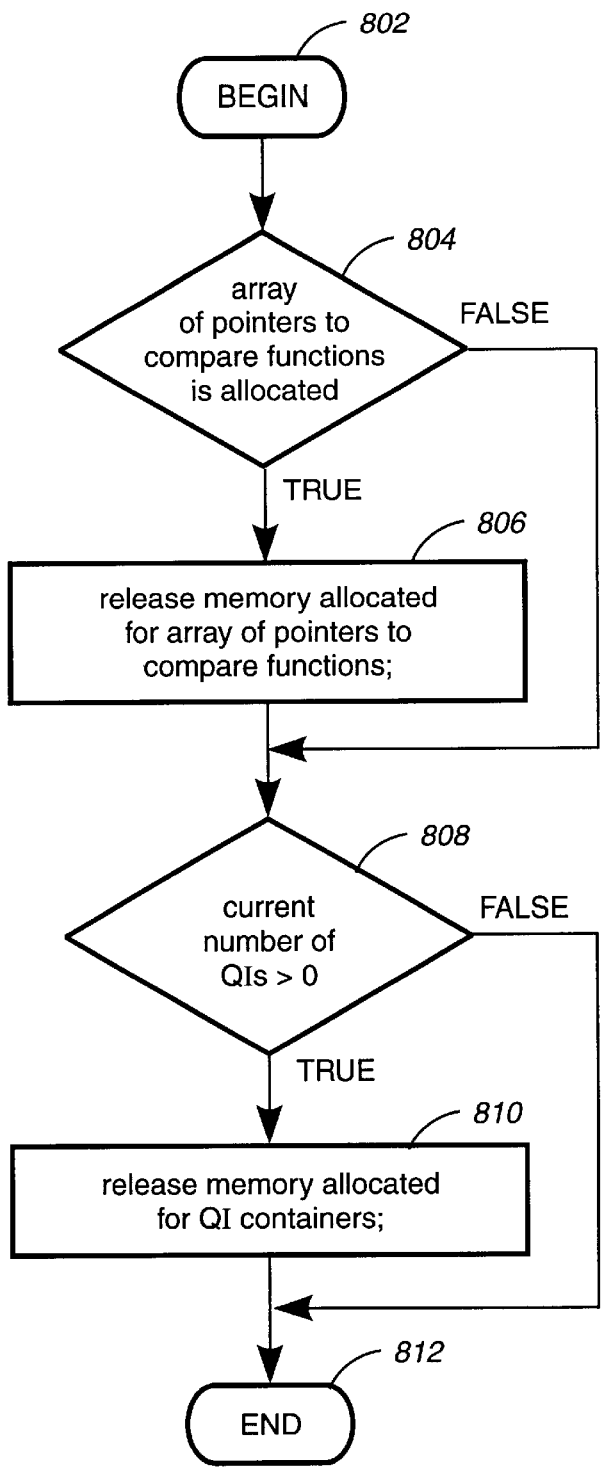

As shown in FIG. 8, the destructor function listed below, upon entering its operation, at step 802, releases certain compare functions in the AutoQ functions 122, at steps 804, 806, and further releases memory 106 that may have been used for the queue data structure 130, at steps 808, 810, and then exits its operational sequence, at step 812.

Figure 9:
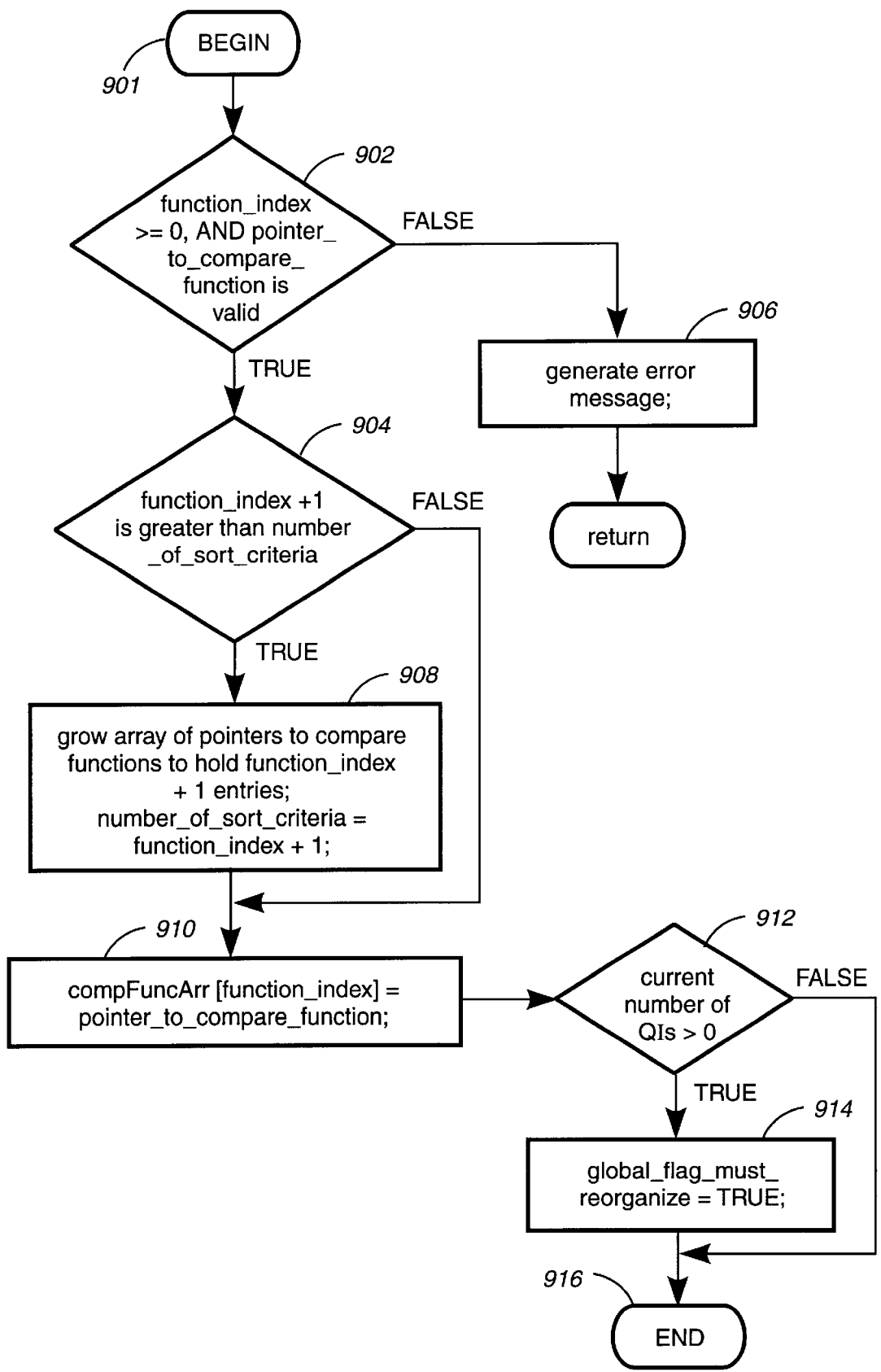

2. ~AutoQ( ),
   purpose:
   destructor function to release all memory used by AutoQ;

Referring now to FIG. 9, we will discuss the setCompareFunction function (as listed below) used in the AutoQ system 122 and that allows the specification of compare functions in a list. The setCompareFunction specifies to the AutoQ system 122 a function that compares two QIs, i.e., to establish their ranking w.r.t. another.

3. setCompareFunction(function_index, compare_function)
   purpose:
   a function that allows the queue administrator to specify the compare functions that the AutoQ system 122 uses to rank QIs for insertion into the queue linked list 126 at the appropriate position;
   a compare function compares two QIs based on those QIs' properties; this property information is contained within the QIs, rather than being directly contained in the AutoQ system 122; this contributes to making this invention very general, in that this invention is independent of the number and nature of the ordering criteria;
   the appropriate position of a QI within the queue is given by the ranking of the new QI with respect to all already enqueued QIs;
   the ranking of two QIs w.r.t. each other is given by all specified compare functions and by their order of specification; however, not all compare functions specified may need to be applied to determine the ranking of a QI to be inserted into the queue, and the AutoQ system makes no more comparisons than necessary;
   there are number_of_sort_criteria compare functions, typically numbered 0 through number_of_sort_criteria—1;
   if a value of an already existing function_index is given, then the compare_function that was specified using that function_index, is redefined; this feature is key to reorganizing the queue:
      one can specify new compare functions, change existing ones, or change the order in which compare functions are to be applied; any of these actions can result in a new ranking of the enqueued items; therefore, if more than one QI is enqueued when setCompareFunction( ) is called then reorganizeQueue( ), see function number 9 below, must be called before adding or retrieving any queue items;

As shown in FIG. 9, the setCompareFunction, as discussed above, adds a compare function to a list, at steps 901, 902, 904, 908, 910, and then if there are QIs in the queue data structure 130 then the setCompareFunction returns a flag that indicates that the linked list 126 must be reorganized, at steps 912, 914, 916.

Figure 10:
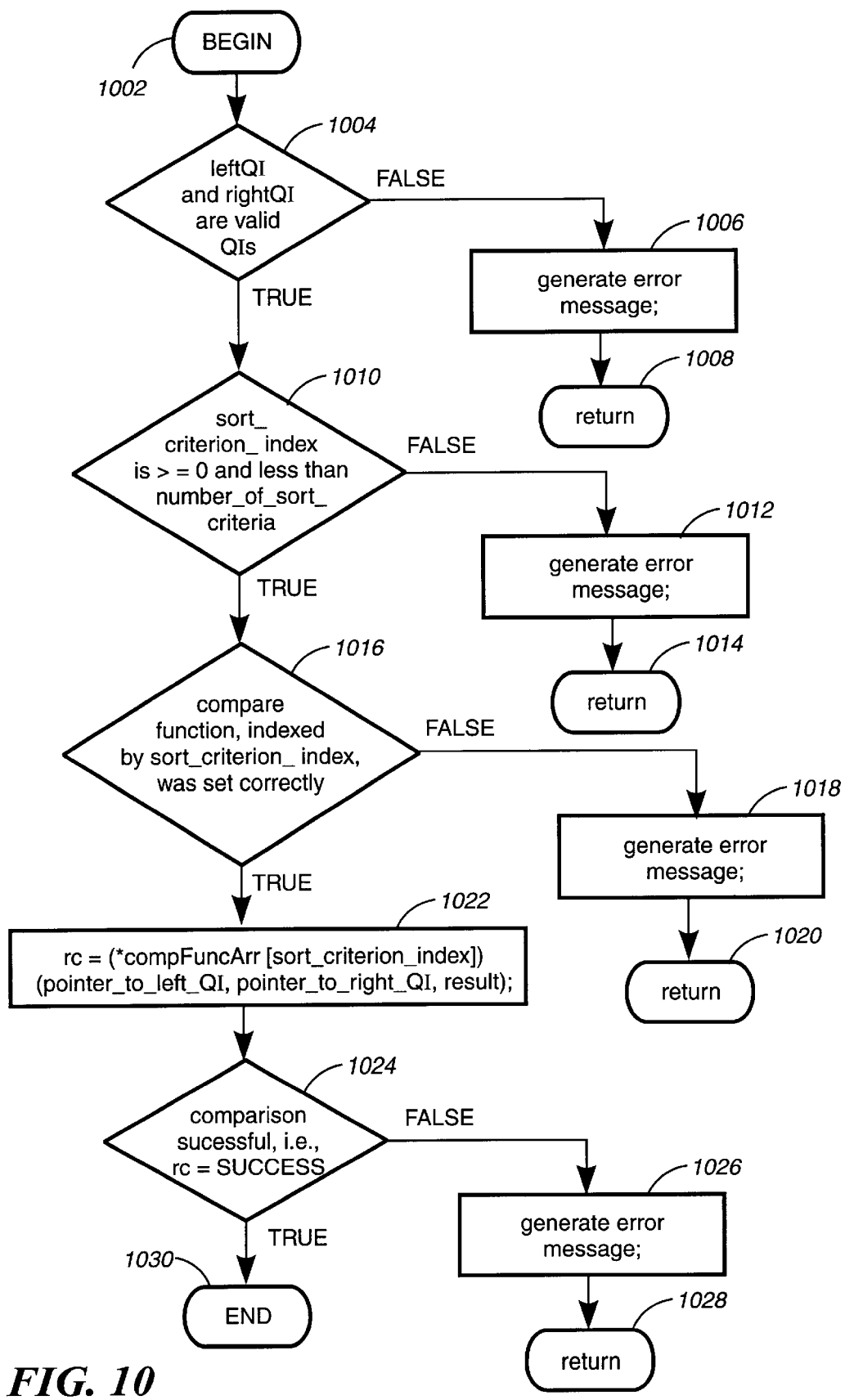
Figure 11:
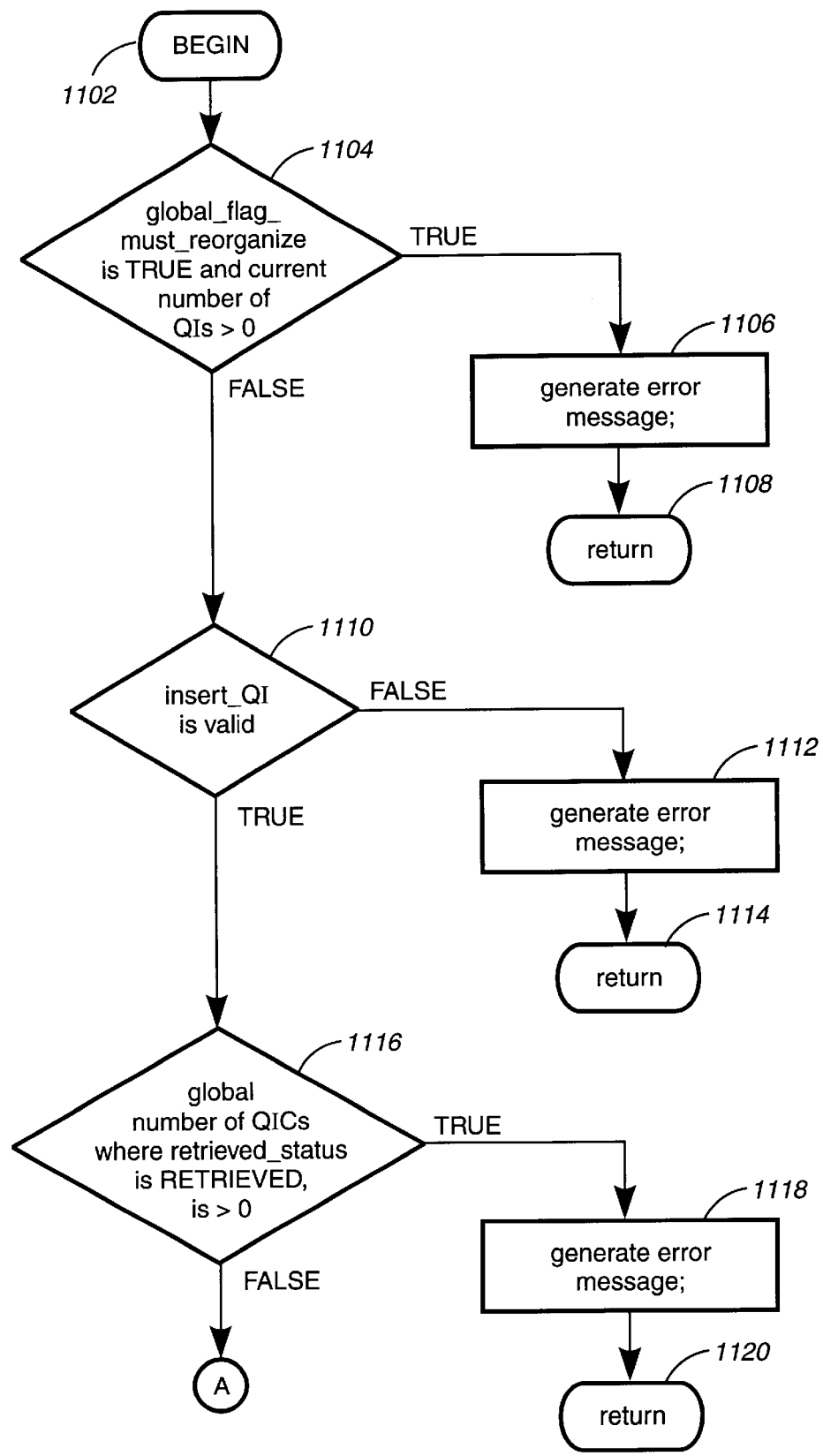
Figure 12:
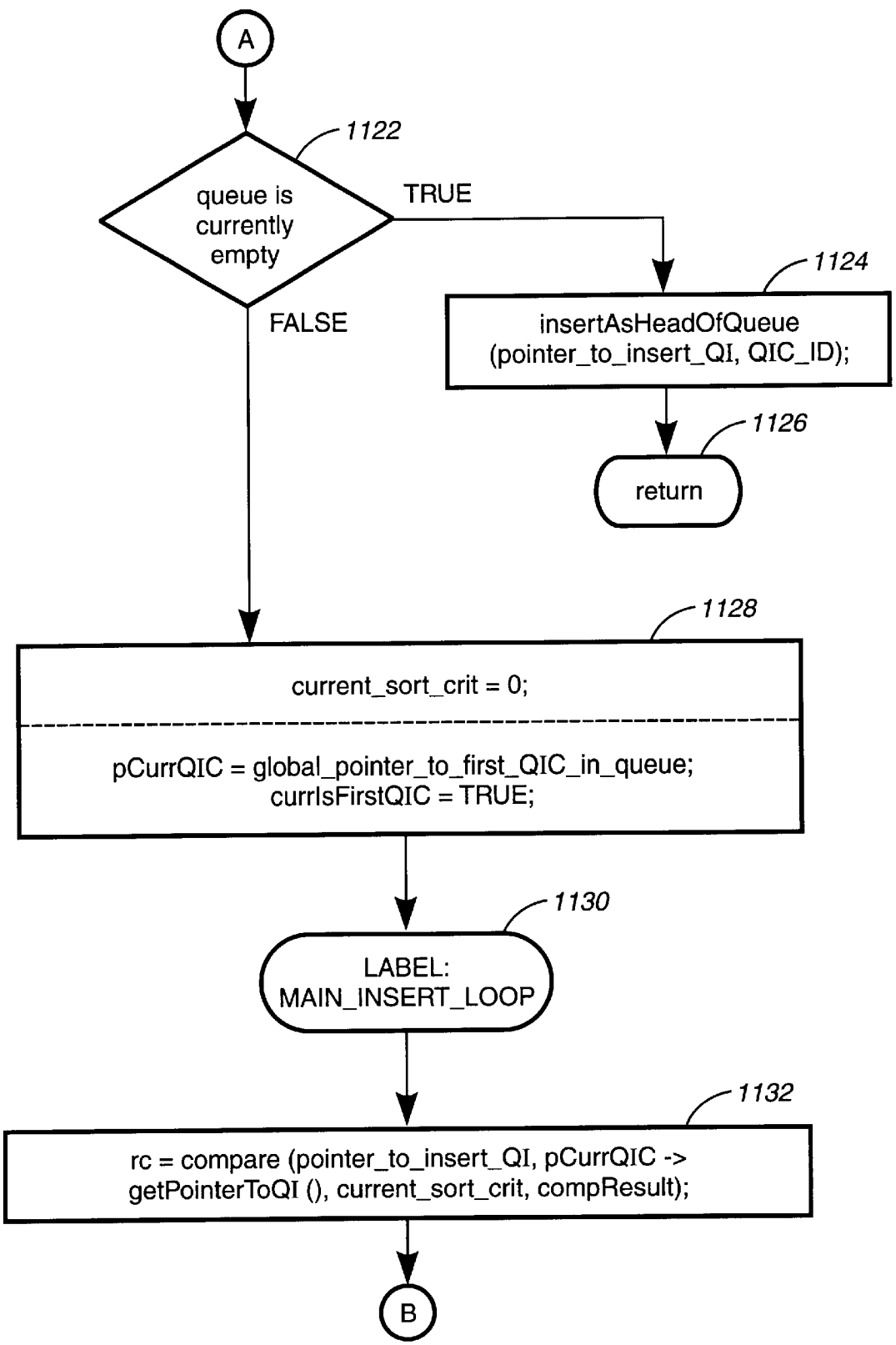
Figure 13:
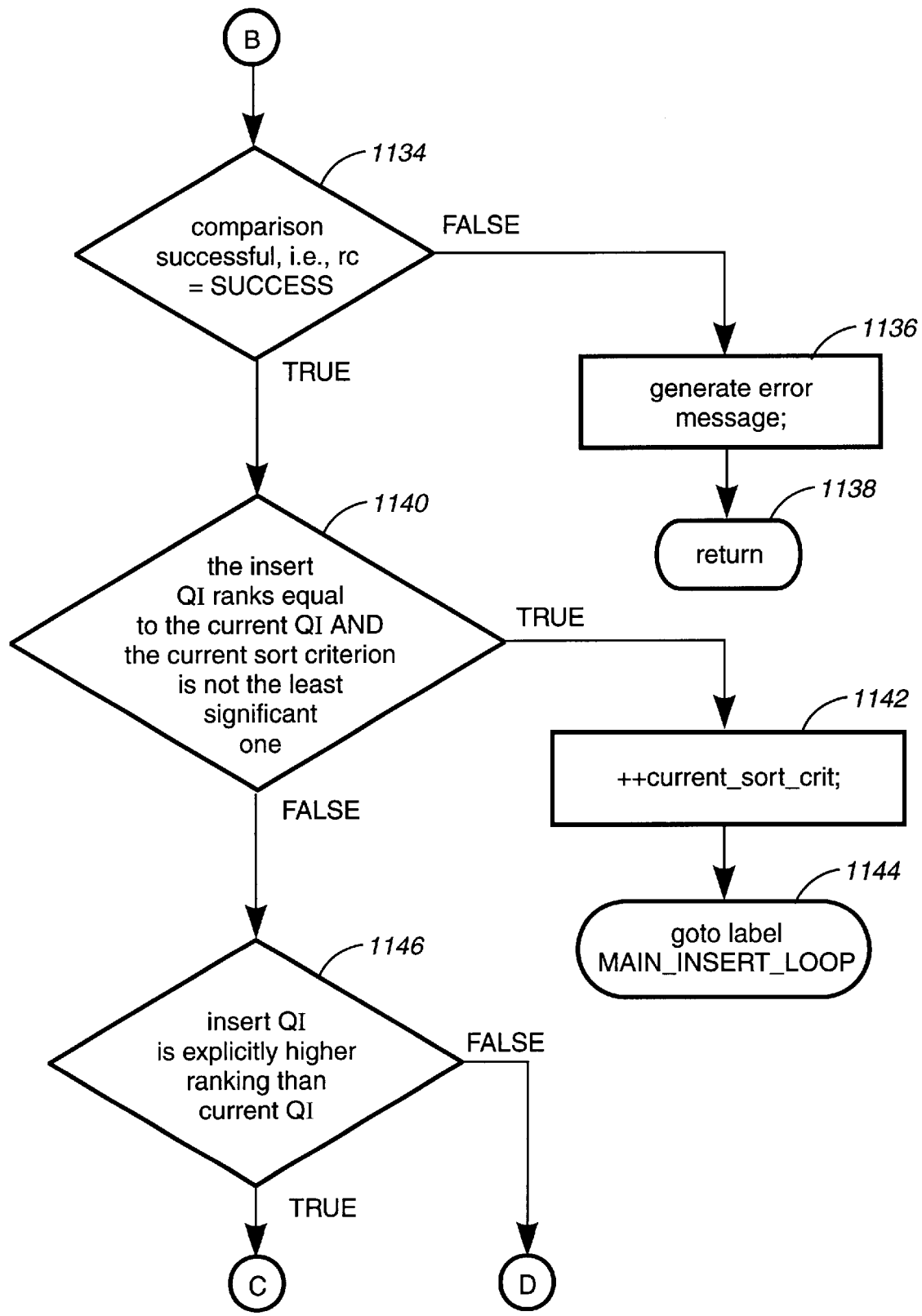
Figure 14:
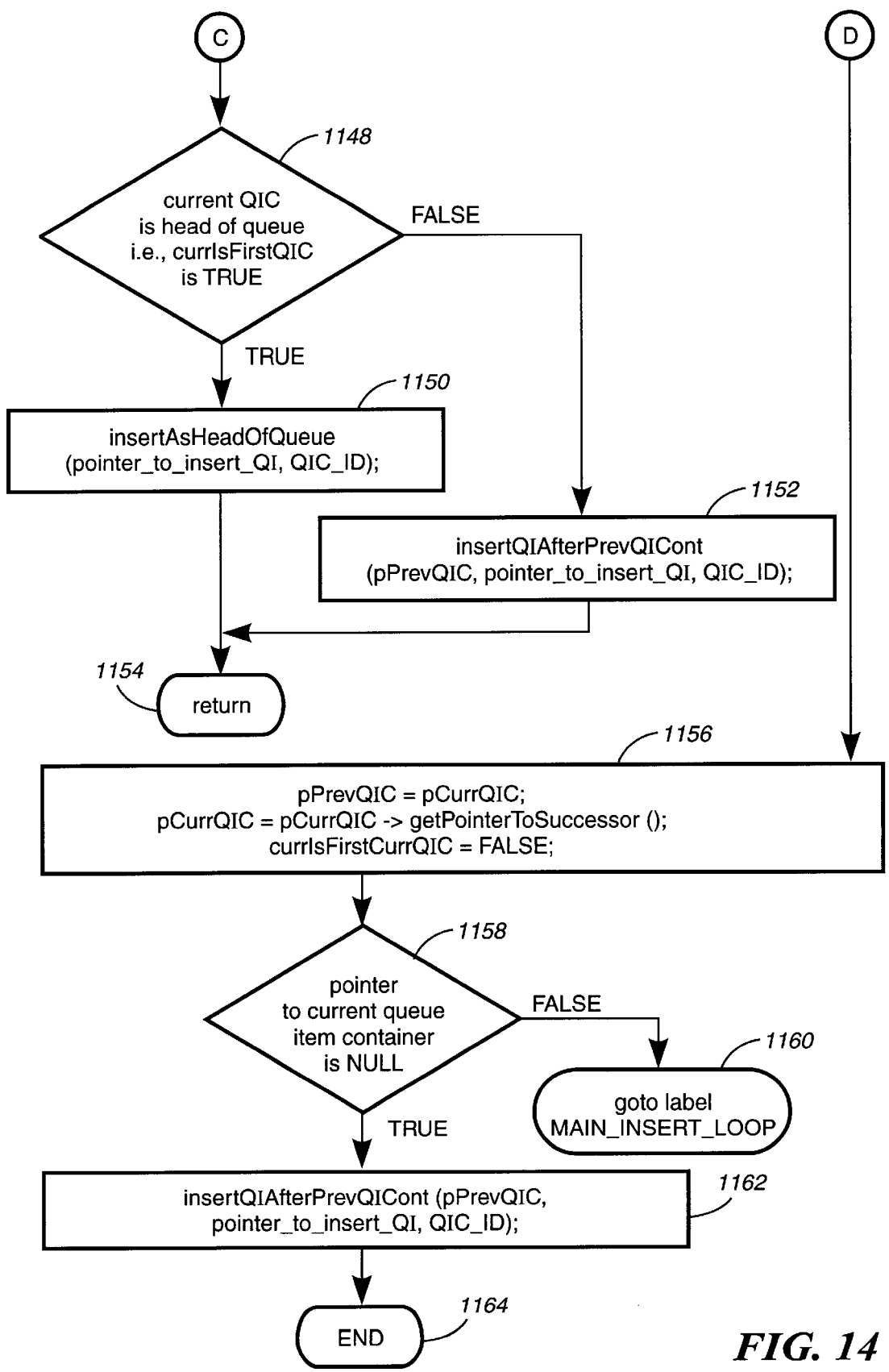

Referring now to FIG. 10, the exemplary compare function (as listed below) compares/ranks two QIs with respect the sort criterion identified by sort_criterion_index. The actual comparison of left_QI and right_QI is done by the compare_function identified by function_index and specified to the AutoQ system by setCompareFunction( ). Note that the exemplary compare function is not necessarily part of the AutoQ system. The exemplary compare function is preferably provided by a user. The compare function is applied, indexed by sort_criterion_index, to the left and right queue items, as discussed below.

4. compare(pointer_to_left_QI, pointer_to_right_QI, sort_criterion_index, result)
   a function to compare/rank two QIs with respect the sort criterion identified by sort_criterion_index; the actual comparison of left_QI and right_QI is done by the compare_function identified by function_index and specified to the AutoQ system by setCompareFunction( ), see above;

The compare function, initially, makes sure that the QIs are valid and that the sort criterion is valid, at steps 1002, 1004, 1006, 1008, 1010, 1012, 1014, 1016, 1018, 1020, and if not valid then a corresponding error message is returned. The compare function then performs a compare of QIs, at step 1022.

If the comparison was not successful, at step 1024, then the compare function returns an error message, at steps 1024, 1026, 1028. On the other hand, when the return code from the comparison function selected by sort_criterion_index indicates SUCCESS, at steps 1024, 1030, the result of the comparison, showing which QI ranks higher, leftQI or rightQI, can be used by the function invoking compare( ).

Referring now to FIGS. 11 through 14, an addQueueItem function (as listed below) encapsulates the pointer to the insert queue item (QI) in a queue item container (QIC), and then enqueues that QIC in the AutoQ system according to the inserted QI's ranking with respect to all already enqueued QIs, and using only as many of the user-specified sort criteria as necessary to uniquely determine the insert QI's rank in the queue.

The addQueueItem function initially verifies, at steps 1102, 1104, 1106, 1108, whether at least one compare function was changed while at least one QI was queued, and therefore, the AutoQ system must reorganize the queue 126 before this insertion in order to guarantee insertion according to currently parameterized order. If reorganization is not needed, at step 1104, then the addQueueItem function validates the QI for insertion into the queue, at steps 1110, 1112, 114. Next, the function determines whether it is attempting to insert a QIs while items in the queue are in a RETRIEVED status, at steps 1116, 1118, 1120. No QIs should be inserted into the queue while items are being retrieved. Then, if the queue linked list 126 is currently empty, at step 1122, then the new QI is inserted at the head of the queue 126, at steps 1124, 1126. Alternatively, at step 1122, the addQueueItem function goes to insert the new queue item according to its rank with respect to other QIs in the queue. First, at step 1128, the addQueueItem function sets the current sort criterion to the most important sort criterion, i.e., to the sort criterion that was specified first, and is indexed by 0. Then, continuing at step 1128, the addQueueItem function sets a pointer to the current queue item container, pCurrQIC, to the first enqueued queue item container, i.e, to the head of the queue. Recall that since the queue is not empty, the addQueueItem function must insert a QI according to its own rank with respect to all queue items currently enqueued, where the ranking is determined by all user-defined sort criteria.

Next, the addQueueItem function compares, at steps 1130, 1132, the QI to be inserted to the QIs which are of higher or equal priority. The addQueueItem function continues comparing QIs until one QI is found that has lower priority than the insert QI, or until the end of the queue is reached, at steps 1134, 1136, 1138, 1140, 1142, 1144, 1146, 1148, 1150, 1152, 1156, 1156. In all cases, the addQueueItem function places the insert QI between the previous QI and the current QI. Note also that if current QI is head of the queue then the insert QI must be made the new head of the queue, at steps 1148, 1150, 1154.

Additionally, when ready to insert the ranked QI, at step 1056, either, the insert QI is explicitly lower ranking than the current QI, or the current QI and the insert QI are equal w.r.t. all sort criteria. However, by definition, even in the latter case, the insert QI is still implicitly lower ranking than the current QI, because the insert QI has spent no time in the queue, whereas any enqueued QI has spent more than zero time in the queue. Since an insert QI is inserted immediately after the lowest ranking enqueued QI of higher or equal rank, the pointer to the current QI must be advanced to its successor, so that the insert QI can be compared to that successor, using the same sort criterion, in the next iteration of the main insert loop. The addQueueItem function, at step 1056, sets the pointer that is pointing to the previous queue item container to point to the current queue item container. Then, the addQueueItem function sets the pointer that is pointing to current queue item container to point to the successor of current queue item container. At this point in the operational sequence, the current QIC is not first in the queue and hence, the insert QI will not be the head of the queue. If, after being advanced to its successor, the pointer to the current QIC is not NULL, at step 1158, then go back to the main insert loop, at step 1160, to compare more QIs.

Lastly, at steps 1162, 1164, the insert QI is determined to be lower ranking than every item in the queue, and therefore the addQueueItem function encapsulates and inserts the insert QI after the previously pointed at queue item container in the queue linked list 126. For more detailed description of the addQueueItem function see below.

5. addQueueItem(pointer_to_insert_QI, QIC_ID)
  purpose:
    a function to encapsulate in a queue item container (QIC), the pointer to the queue item (QI) to be inserted, and to subsequently enqueue that QIC in the AutoQ system, according to that QI's ranking with respect to all sort criteria;
  how addQueueItem( ) works:
    A QIC is enqueued in the AutoQ system in order of descending rank of the QI that the QIC contains.

The ranking of two QIs rank w.r.t. another is determined by applying the user-specified compare functions to these QIs, where each compare function implements one sort criterion (SC).

A compare function indicates which one of its two argument QIs ranks higher with respect to the sort criterion it implements, or if the QIs are of equal rank w.r.t. that SC.

The order in which the user specifies the compare functions implies their relative importance, the most important one being specified first.

To rank two QIs, all compare functions are applied in their order of specification, the most important one first, until it is either determined which QI ranks higher, or until there are no more compare functions to apply.

Among QIs that are of equal rank w.r.t. all sort criteria, the QI that has been in the queue for the longer time ranks higher, implying that a new QI to be inserted into the queue, has a lower rank than all enqueued QIs that are otherwise equal w.r.t. all sort criteria.

AutoQ inserts a new QIC into its queue directly before the highest ranking QI that is already enqueued, and that ranks lower that the insert QI.

If no QI is found in the queue that ranks lower than the insert QI then the insert QI is inserted at the end of the queue, which, in the case of an empty queue, is equivalent to being inserted as the head of the queue.

The ranking of two QIs w.r.t. another, is explicit ranking in the sense determined by the compare functions. If two QIs are equal w.r.t. all compare functions, then their ranking will still be implicitly different, because in that case the duration of how long a QI is enqueued determines the ranking, where a longer queue time implies a higher rank. In that sense, an insert QI can never have the same rank as an enqueued QI. However, in the flowcharts below, explicit ranking is used, while the implicit ranking due to the queue time, occurs by queuing explicitly equal QIs in FIFO fashion.

The details of inserting a QI are best understood in terms of the flow diagram representation of this function.

Figure 15:
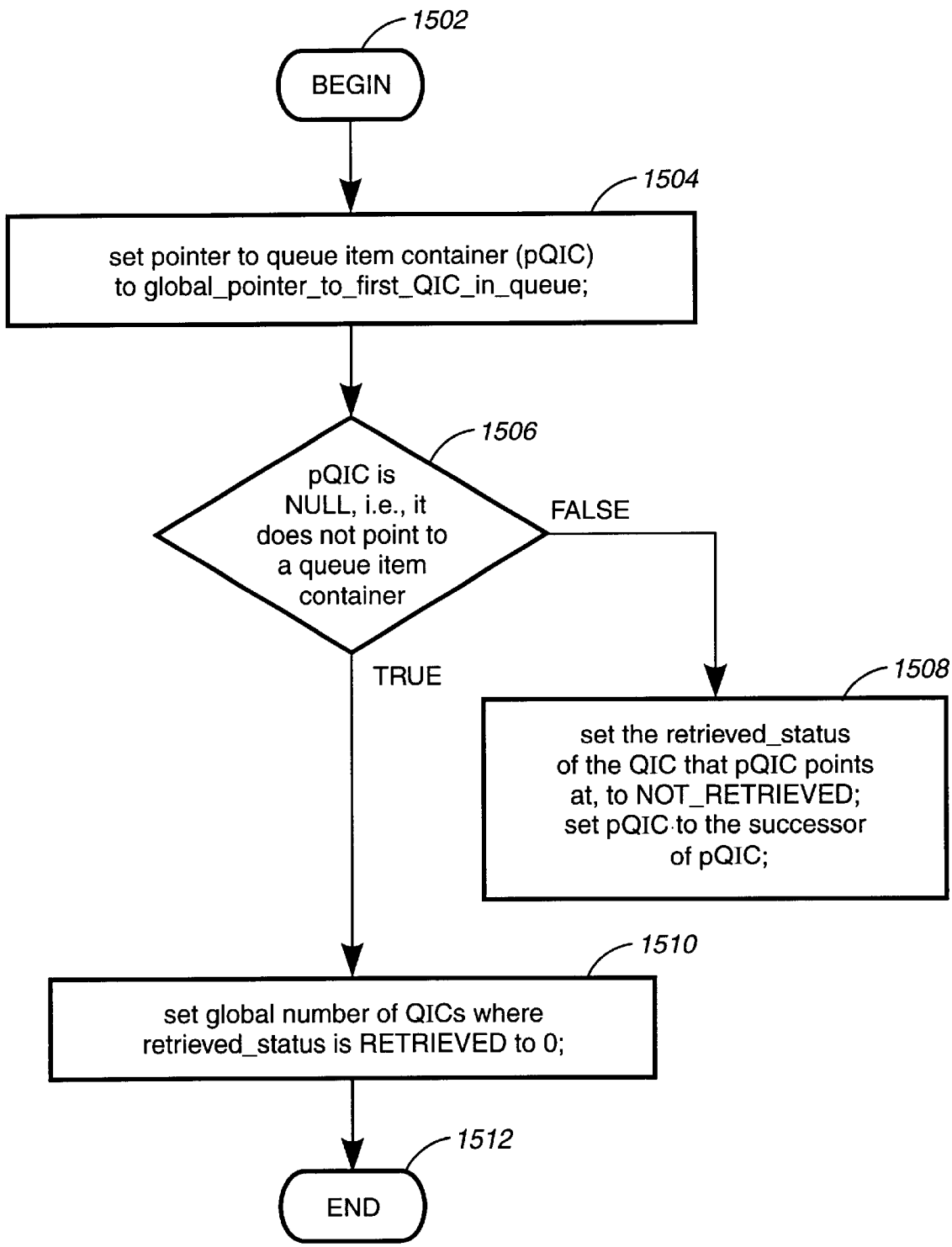

Referring now to FIG. 15, the resetAllRetrievedStati function resets the retrieved status of all enqueued items, i.e., all QIs. The status is therefore set to NOT_RETRIEVED to indicate that all QIs can be retrieved. Specifically, the function starts at first QIC in the queue, at steps 1502, 1504, and then sets all QIC retrieved status to NOT_RETRIEVED, at steps 1506, 1508, and then zeros the count of retrieved QIs and exits the operational sequence, at steps 1510, 1512.

Figure 16:
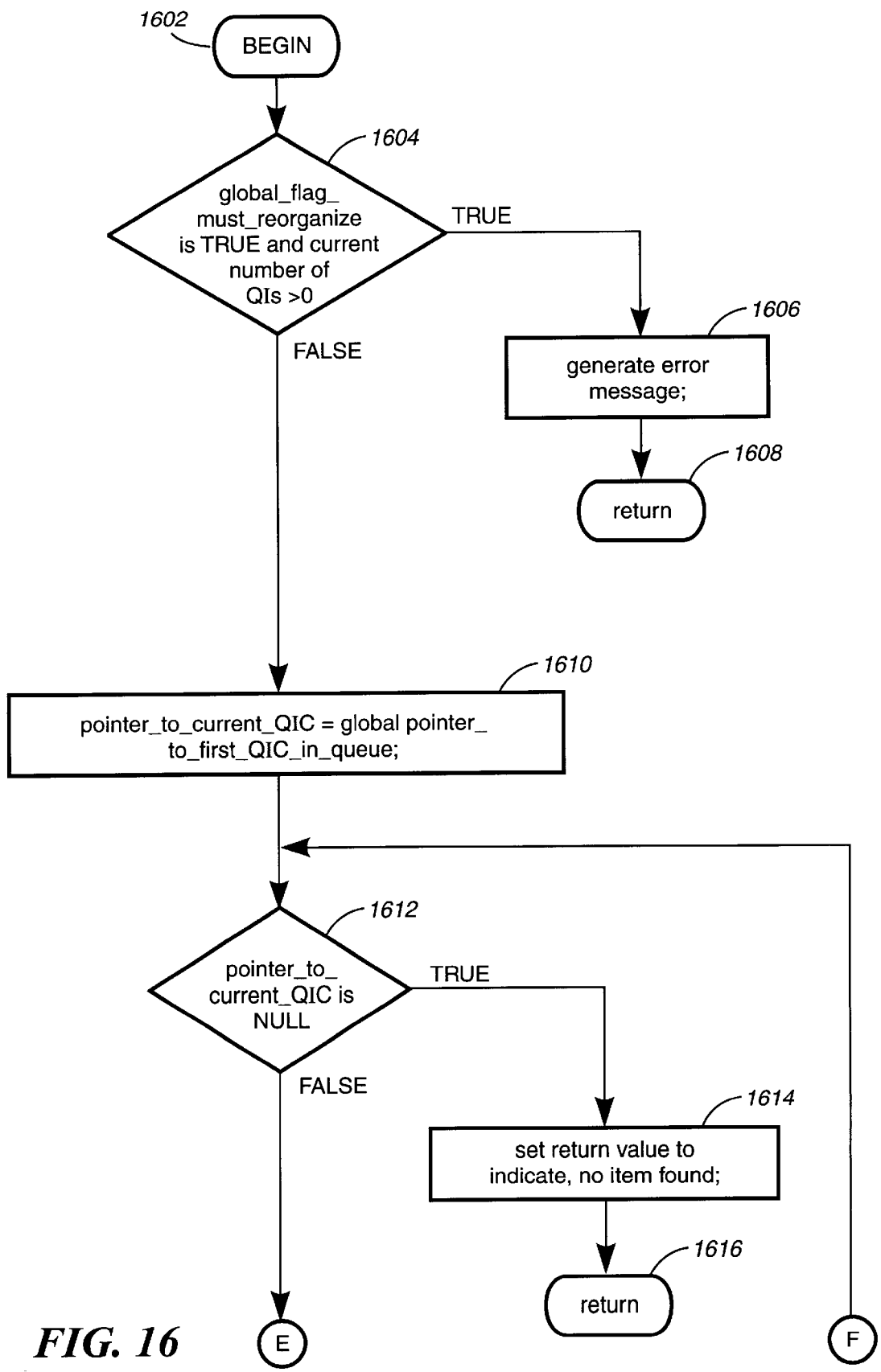
Figure 17:
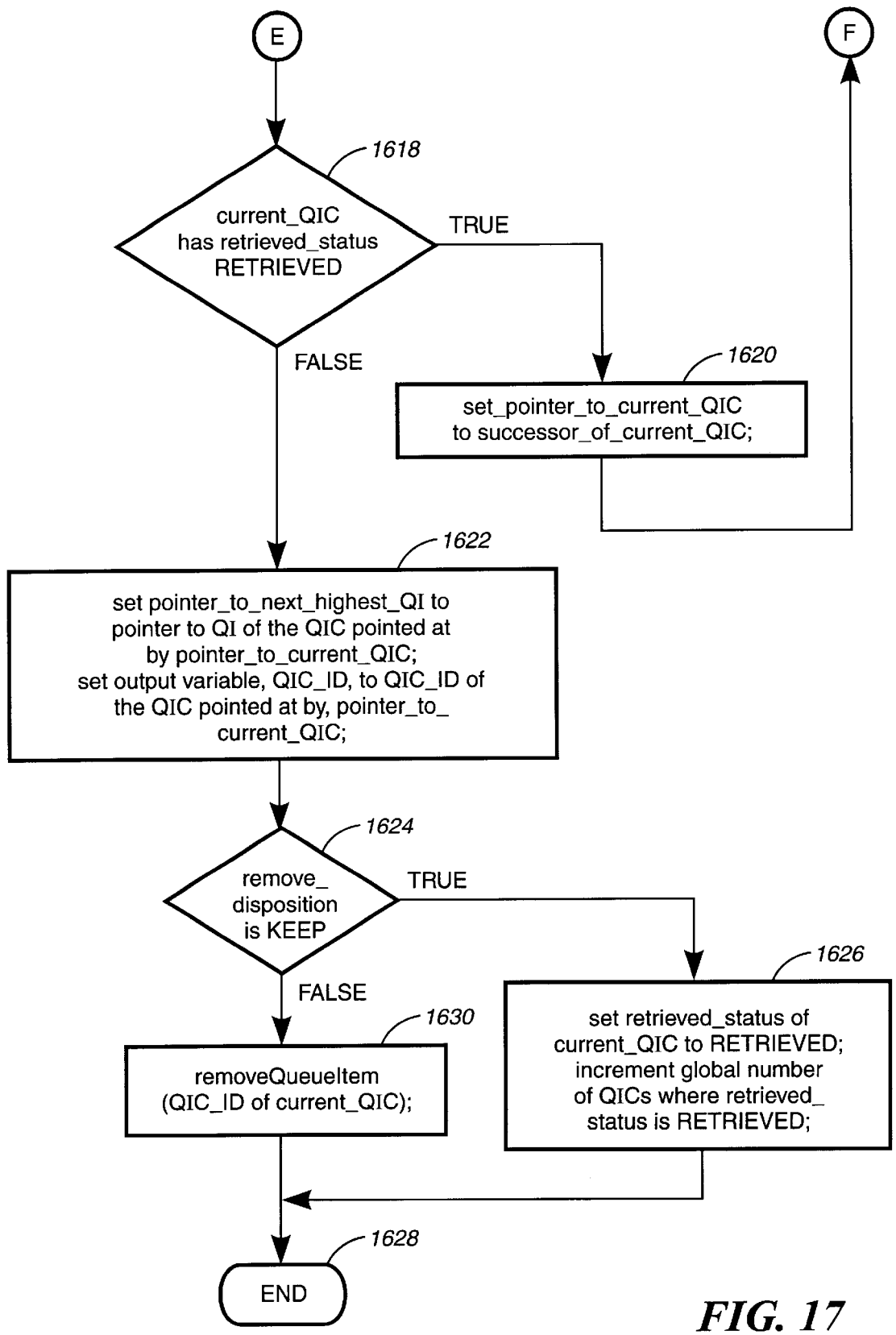

6. resetAllRetrievedStati( )
  purpose:
    a function to reset the retrieved_status of all enqueued queue items to NOT_RETRIEVED, implying that all QIs can be retrieved;

Referring now to FIGS. 16 and 17, a retrieveHighestRankingQI function retrieves the currently highest ranking queue item whose retrieved_status is NOT_RETRIEVED. If parameter remove disposition is set to KEEP then retrieved_status of retrieved item is set to RETRIEVED and the queue item container (QIC) that encapsulates the pointer to, and queuing information about the retrieved QI, is not deleted from the queue. Alternatively, the QIC that encapsulates the pointer to the retrieved QI is deleted from the queue.

First of all, at steps 1602, 1604, 1606, 1608, if at least one compare function was changed while at least one QI was queued, then the AutoQ system must reorganize queue before this retrieval, in order to guarantee retrieval according to currently parameterized order. Then, the retrieveHighestRankingQI function searches for the first QI in the queue linked list 126 that has status NOT_RETRIEVED, at steps 1614, 1616, 1618, 1620, 1622, and sets pointer to next highest QI to point to the QIC of the successor to the current QI. Lastly, the retrieveHighestRankingQI function, according to the parameter remove_disposition will either keep the QI represented in the queue, at steps 1624, 1626, 1628, or remove the QI totally from the queue, at steps 1624, 1630, 1628. More details of the function are listed below.

Figure 18:
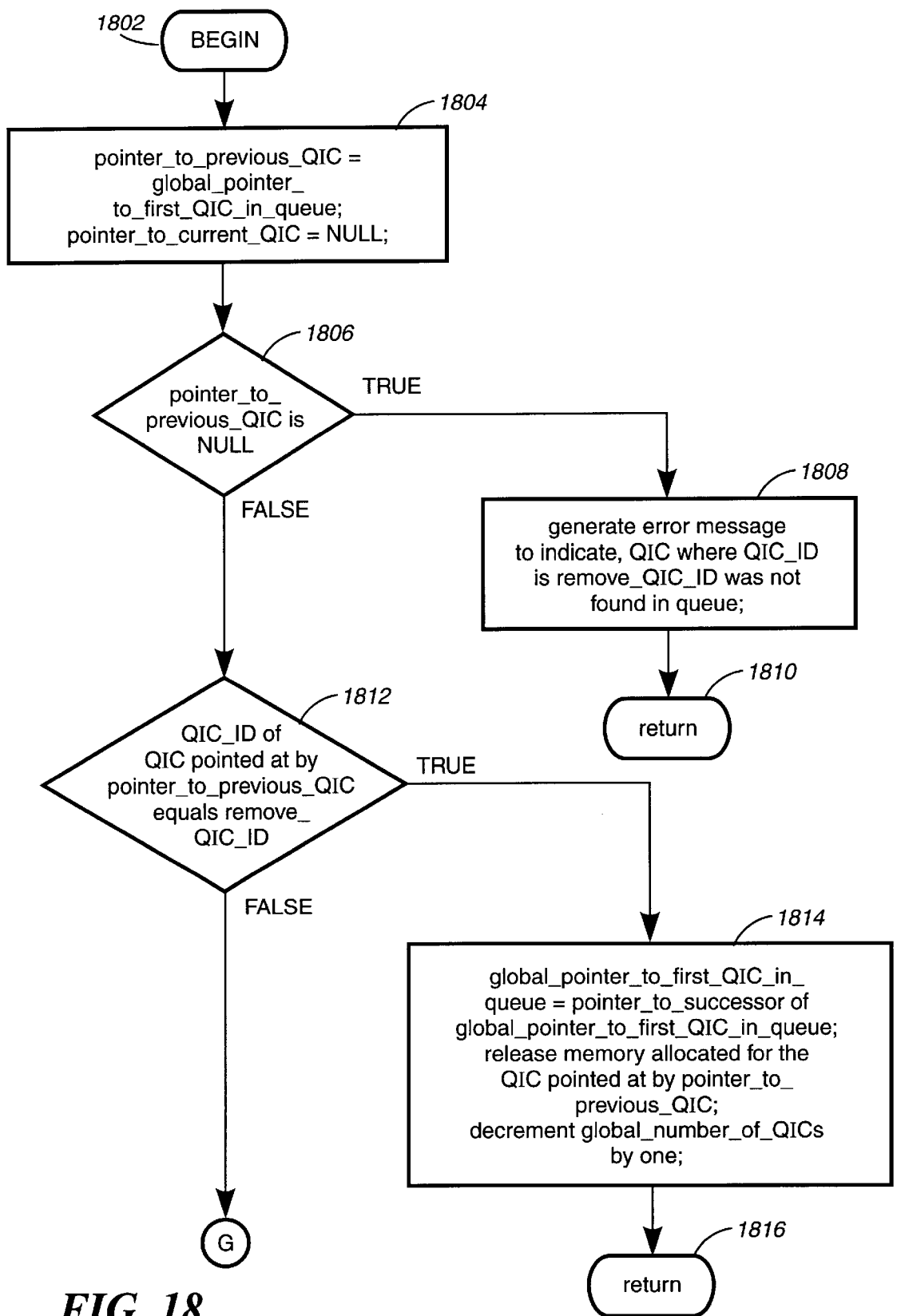
Figure 19:
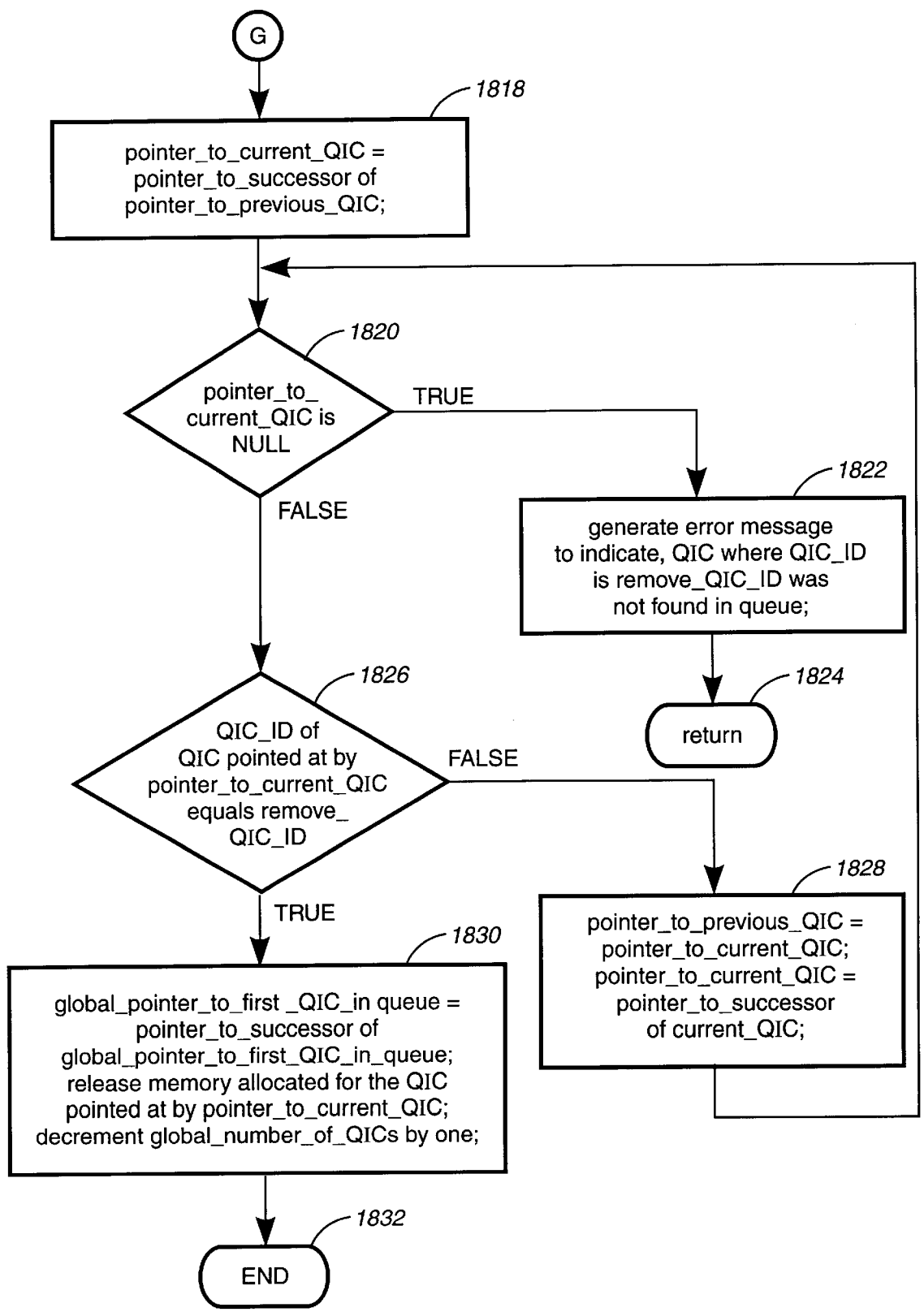

7. retrieveHighestRankingQI(pointer_to_next_highest_QI, remove_disposition, QIC_ID)
  purpose:
    a function to retrieve the currently highest ranking queue item where the retrieved status is, NOT_RETRIEVED;

if remove_disposition is KEEP then retrieved_status of retrieved item is set to RETRIEVED;

else the retrieved queue item container (QIC) that encapsulates the retrieved queue item (QI) is removed from the queue;

Referring now to FIGS. 18 and 19, a flow diagram for the removeQueueItem function is illustrated. This function removes a queue item (QI) uniquely identified by the parameter QIC_ID from the AutoQ system. After initializing pointers, at steps 1802, 1804, the function determines whether the QI to remove is actually found in the queue, at steps 1806, 1808, 1810, and whether the QI to remove is the head of the queue, at steps 1812, 1814, 1816. The function then searches QIC in the queue linked list 126, at steps 1818, 1820, 1822, 1824, 1826, 1828, until it finds the QIC corresponding to the QI to be removed from the queue. Then, at steps 1830, 1832, after finding the particular QIC the function deletes the QIC from the queue.

Figure 20:
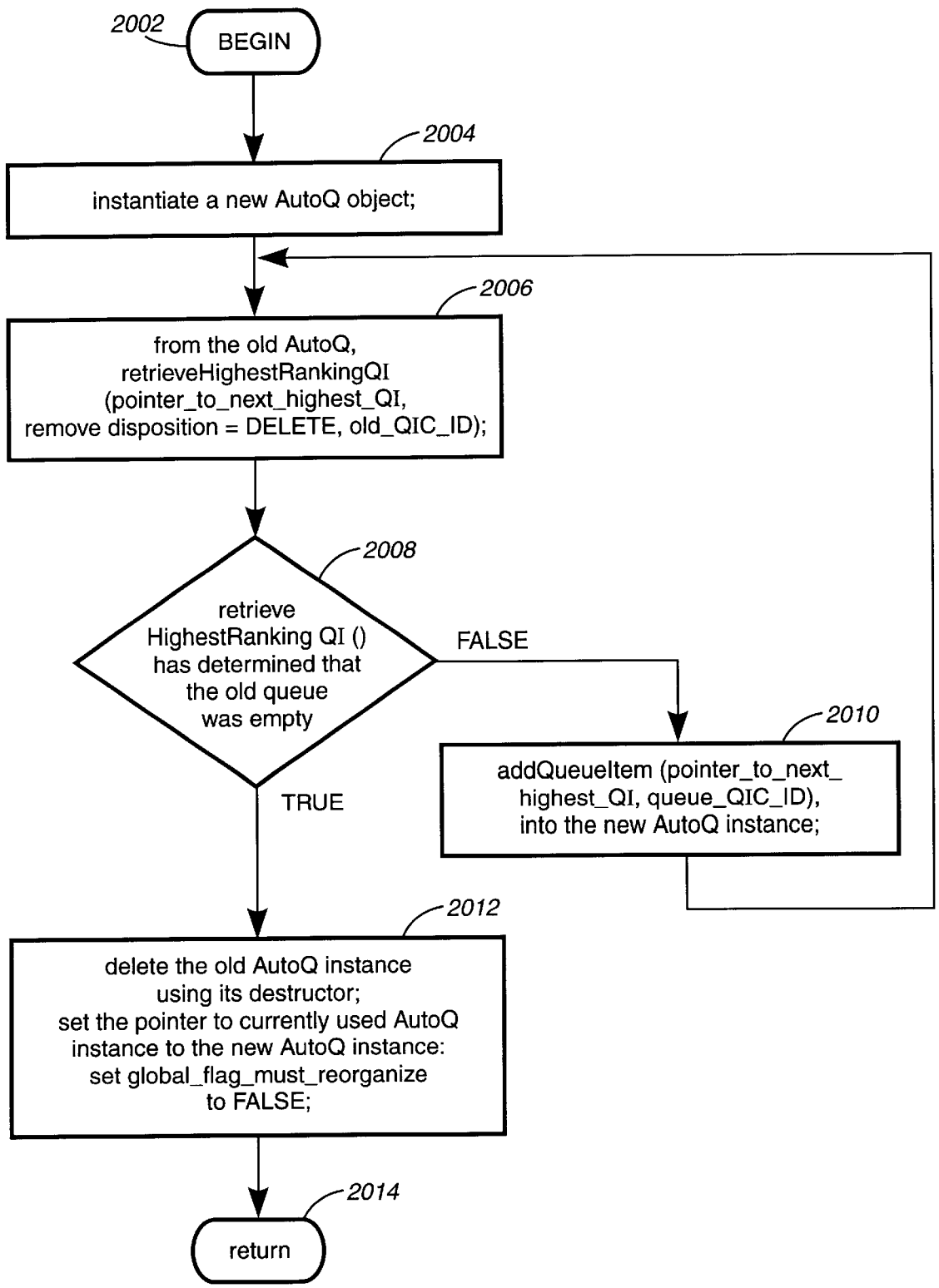

8. removeQueueItem(QIC_ID)

purpose:

a function to remove the queue item uniquely identified by queue item container id (QIC_ID) from the AutoQ system;

Referring now to FIG. 20, the operational sequence of the reorganize function reorders the currently enqueued queue items (QIs). This function must be invoked when the number or order of the compare_functions was changed, using setCompareFunction( ), and while more than one QI was enqueued. The reorganize function, at steps 2002, 2004, creates a new AutoQ object, and then moves QIC's, in decreasing ranking order, from the old AutoQ object to the new AutoQ object, at steps 2006, 2008, 2010, 2012, 2014.

9. reorganizeQueue( )

purpose:

a function to reorder the queue items currently enqueued in the AutoQ system;

how reorganizeQueue( ) works:

First, this function instantiates a new AutoQ object. Then, as long as the old AutoQ object contains Queue Item Containers (QICs), reorganizeQueue( ) retrieves and removes a QIC from the old AutoQ instance and inserts that QIC into the new AutoQ, which will automatically happen according to the new, ordered set of compare_ functions.

Figure 21:
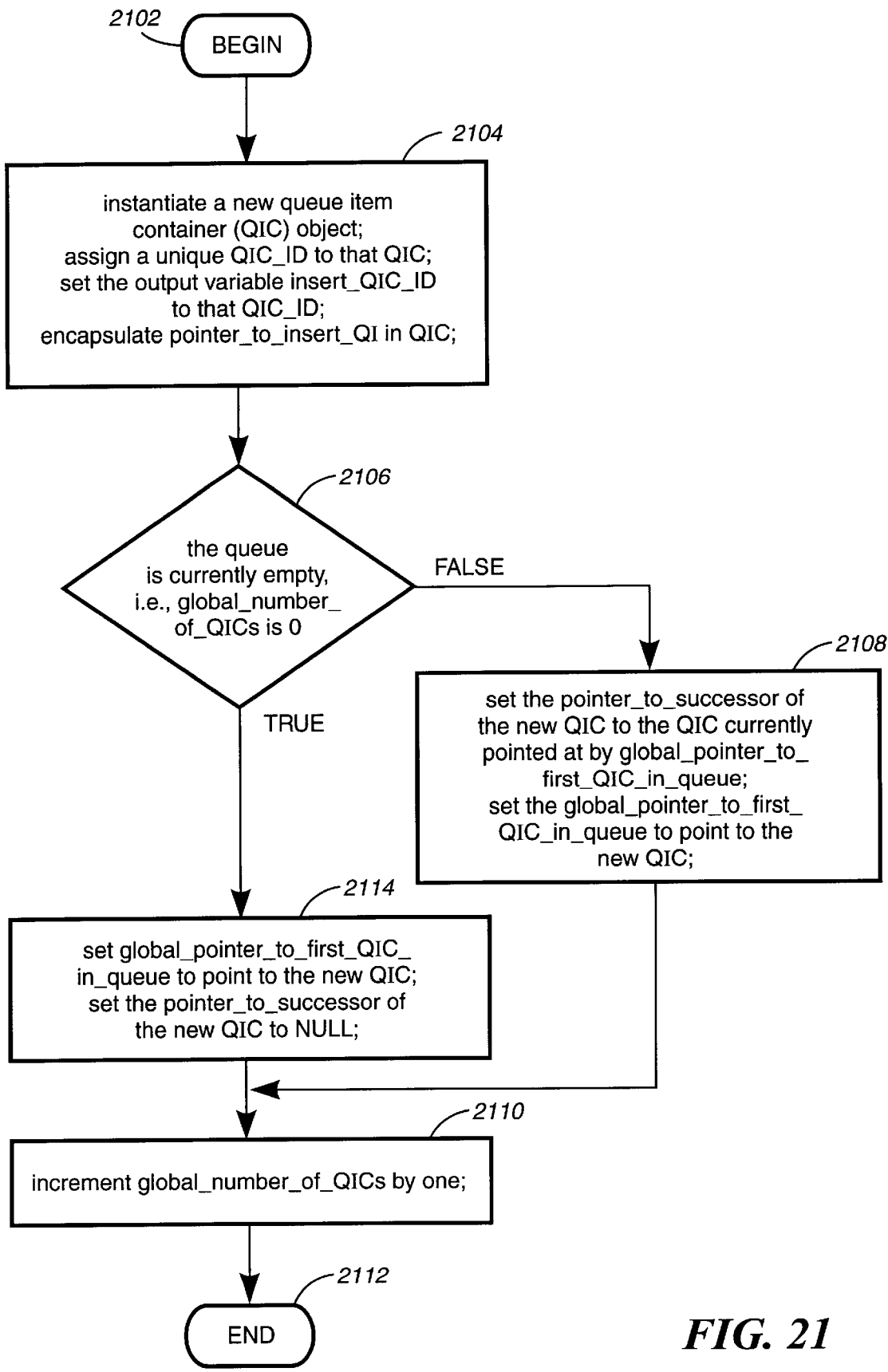
Figure 22:
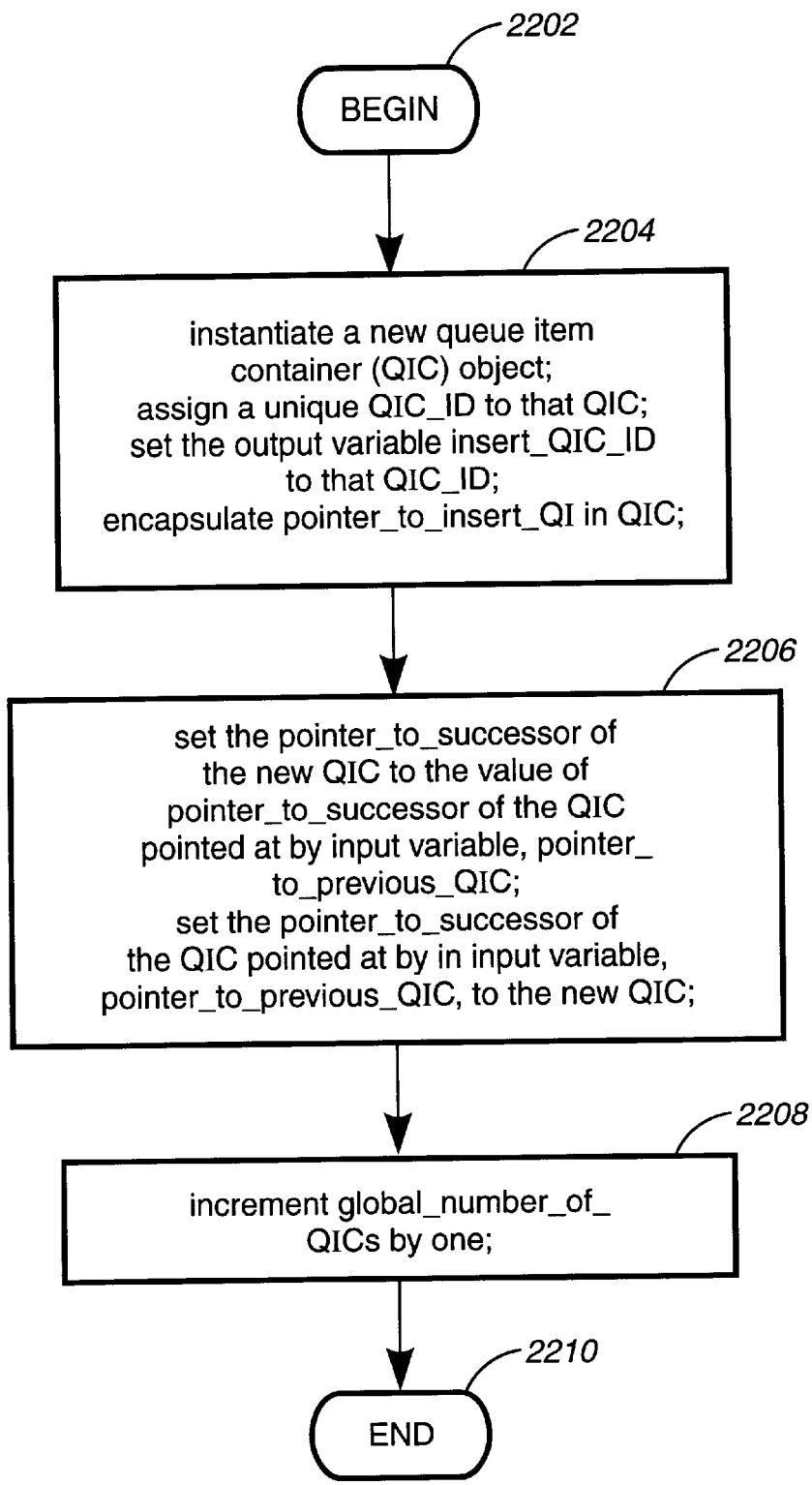

Lastly, FIG. 21 illustrates a first private internal function to the AutoQ system and FIG. 22 illustrates a second private internal function to the AutoQ system.

Specifically, with respect to FIG. 21, the insertAsHeadOfQueue function encapsulates the insert queue item (QI) pointed at by the input variable, pointer_to_insert_QI, in a new queue item container (QIC) object. The function also sets the output variable, insert_QIC_ID, to the value of the unique identifier (ID) of the new QIC object. Further, the function inserts the new QIC object that contains pointer_ to_insert_QI, as the new head/first element into the queue linked list 126. The function, at steps 2102, 2104, initially instantiates a new QIC for the queue. Then, the function verifies, at step 2106, if the queue is currently empty. If it is not empty, then, at steps 2108, 2110, 2112, the function adds the new QIC to the head of the queue. Alternatively, if the queue is empty, at steps 2106, 2110, 2112, then the function adds the first new QIC to the head of the queue.

With reference to FIG. 22, the second private internal function inserts a QIC after a previous QIC. This function specifically encapsulates the insert queue item (QI) pointed at by the input variable, pointer_to_insert_QI, in a new queue item container (QIC) object, at steps 2202, 2204. The function additionally, at step 2204, sets the output variable, insert_QIC_ID, to the value of the unique identifier (ID) of the new QIC object. Moreover, at steps 2204, 2206, 2208, 2210, the function inserts the new QIC object that contains pointer_to_insert_QI directly after the QIC object pointed at by the input variable, pointer_previous_QIC, and exits the operational sequence.

Generalizations

To generalize the AutoQ system 122 to the case where the queued tasks have a release date before which they may not be retrieved for processing, even though they may be deleted from the queue, the AutoQ retrieval routine/s would simply check if the retrieval candidate may be processed at the time of retrieval. If so, then there is no change compared to the case of no release date; otherwise, the retrieval routine would go down the list of QIs until a QI is found that can be processed, or until the queue has been traversed.

In summary, the AutoQ system 122 includes a functional queue that is prioritized according to sort criteria 132 that can change while the functional queue is operational. The functional queue includes a set of functions 122, as discussed above, that operate on a queue data structure 130 to maintain enqued items prioritized in the queue data structure 130 according to the sort criteria 132. Even during run time of the AutoQ system 122 the sort criteria 132 can be changed and the functional queue will be re-prioritized by the set of functions 122, including a prioritizer 124, that operate on the queue data structure 130 to maintain the enqued items prioritized in the queue data structure 130 according to the changed sort criteria 132.

The queue data structure 132 includes at least one linked list of pointers 126 that point to actual items 140, 142, 144, in memory 106, respectively, thereby representing the actual items 140, 142, 144, as enqued items in the functional queue. This representation of enqued items by a linked list of pointers 131, 133, 135, to actual items 140, 142, 144, in memory 106 allows a fast and efficient process for managing the functional queue and sorting the enqued items based on the sort criteria, even if the sort criteria are changed in real time during an operational sequence of the computing system. This is a significant advantage of the present invention not available in other prior art computing systems. A valuable aspect of the functional queue, according to a preferred embodiment of the present invention, is the ability to prioritize enqued items in the functional queue based on changing sort criteria 132. Additionally, the functional queue can operate using an arbitrary number of sort criteria 132 and with sort criteria 132 of arbitrary values. This is again a significant advantage of the present invention not available in prior art computing systems.

The present invention can be realized in hardware, software, or a combination of hardware and software. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method comprising the steps of:
    enqueuing items in a functional queue stored in memory, the enqueued items being prioritized in memory according to an arbitrary number of sort criteria stored in memory, the functional queue storing in memory a highest priority enqueued item at a head of the functional queue;
    modifying at run time the sort criteria in memory while the functional queue contains the enqued items in memory; and
    re-prioritizing the enqued items in the functional queue at run time according to the modified sort criteria in memory.

2. The method of claim 1, wherein the functional queue comprises a set of functions that operate on a queue data structure in memory to maintain enqued items prioritized in the queue data structure in memory according to the sort criteria stored in memory.

3. The method of claim 2, wherein the sort criteria can be changed in memory at run time while the set of functions are operational on the queue data structure to maintain the enqued items prioritized in the queue data structure according to the sort criteria, the functional queue storing in the memory a highest priority enqueued item at a head of the queue data structure.

4. The method of claim 2, wherein the queue data structure includes at least one linked list of pointers that point to actual items, respectively, thereby representing the actual items as enqued items in the functional queue.

5. The method of claim 4, wherein the re-prioritizing step comprises the step of sorting the at least one linked list of pointers according to the modified sort criteria.

6. The method of claim 1, wherein the enqueued items comprise enqueued job items for operating jobs in the computing system according to a priority of enqueued job items in the functional queue.

7. The method of claim 1, wherein the sort criteria comprise arbitrary values.

8. The method of claim 1, wherein the enqueued items comprise enqueued job items for operating jobs in a computing system according to a priority of enqueued job items in the functional queue, and wherein the re-prioritizing reprioritizes the enqueued job items in the functional queue at run time according to the modified sort criteria in memory.

9. The method of claim 1, wherein the enqueued items are enqueued job items for operating jobs in a computing system according to a priority of enqueued job items in the functional queue with the highest priority enqueued job item at the head of the functional queue designating the highest priority job for operating in the computing system.

10. A computing system comprising:
    a functional queue in memory for enqueueing job items for operating jobs in the computing system according to a priority of enqueued job items in the functional queue; and
    a prioritizer, communicatively coupled to the functional queue in memory, for prioritizing enqued job items in the functional queue based on an arbitrary number of soil criteria stored in memory, the arbitrary number of sort criteria in memory being modifiable at run time, and
    wherein the prioritizer re-prioritizes the enqued job items in the operational queue based on the sort criteria in memory after at least one of a change in the sort criteria in memory and a new job item is enqued in the operational queue.

11. A computing system comprising:
    memory for storing a functional queue and an arbitrary number of sort criteria; and
    a prioritizer, communicatively coupled to the memory, for prioritizing enqued items in the functional queue based on the sort criteria stored in memory, the sort criteria in memory being modifiable at run time, and
    wherein the prioritizer re-prioritizes the enqued items in the functional queue in response to the sort criteria being changed the memory at run time.

12. The computing system according to claim 11, wherein the functional queue comprises a set of functions and a queue data structure that are stored in the memory, the functions that operate on the a queue data structure stored in the memory to maintain enqued items in the queue data structure prioritized in the queue data structure according to the sort criteria stored in the memory.

13. The computing system according to claim 12, wherein the sort criteria can be changed in the memory at run time while the set of functions are operational on the queue data structure to maintain the enqued items prioritized in the queue data structure in the memory according to the sort criteria in the memory, the functional queue storing in the memory a highest priority enqueued item at a head of the queue data structure.

14. The computing system according to claim 12, herein the queue data structure includes at least one linked list of pointers that point to actual items, respectively, thereby representing the actual items as enqued items in the functional queue.

15. The computing system according to claim 14, wherein the prioritizer sorts the at least one linked list of pointers according to the sort criteria.

16. The computing system according to claim 11, wherein the enqueued items comprise enqueued job items for operating jobs in the computing system according to a priority of enqueued job items in the functional queue.

17. The computing system according to claim 11, wherein the sort criteria comprise arbitrary values.

18. The computing system according to claim 11, wherein the enqueued items comprise enqueued job items for operating jobs in the computing system according to a priority of enqueued job items in the functional queue, and wherein the re-prioritizing reprioritizes the enqueued job items in the functional queue at run time according to the modified sort criteria in memory.

19. A computer readable medium including computer instructions for a queuing system, the computer instructions comprising instructions for:
   enqueuing items in a functional queue stored in memory, the enqueued items being prioritized in memory according to an arbitrary number of sort criteria stored in memory, the functional queue storing in memory a highest priority enqueued item at a head of the functional queue;
   modifying at run time the sort criteria in memory while the functional queue contains the enqued items in memory; and
   re-prioritizing the enqued items in the functional queue at run time according to the modified sort criteria in memory.

20. The computer readable medium of claim 19, further including computer instructions for:
   a set of functions that operate on a queue data structure in memory to maintain enqued items prioritized in the queue data structure in memory according to the sort criteria stored in memory.

21. The computer readable medium of claim 20, wherein the sort criteria can be changed in memory at run time while the set of functions are operational on the queue data structure to maintain the enqued items prioritized in the queue data structure according to the sort criteria, the functional queue storing in the memory a highest priority enqueued item at a head of the queue data structure.

22. The computer readable medium of claim 20, wherein the enqueued items comprise enqueued job items for operating jobs in a computing system according to a priority of enqueued job items in the functional queue.

23. The computer readable medium of claim 20, wherein the sort criteria comprise arbitrary values.

* * * * *

UNITED STATES PATENT AND TRADEMARK OFFICE
CERTIFICATE OF CORRECTION

PATENT NO. : 6,728,792 B2
DATED : April 27, 2004
INVENTOR(S) : Marcus Wagner

It is certified that error appears in the above-identified patent and that said Letters Patent is hereby corrected as shown below:

Column 16,
Line 21, delete "soil" and insert -- sort --.
Line 38, after the word "changed" insert -- in --.
Line 54, delete "herein" and insert -- wherein --.

Signed and Sealed this

Twenty-ninth Day of June, 2004

JON W. DUDAS
*Acting Director of the United States Patent and Trademark Office*